US012286348B2

(12) United States Patent
Watanabe

(10) Patent No.: US 12,286,348 B2
(45) Date of Patent: Apr. 29, 2025

(54) NOBLE GAS HYDRIDE, FUEL, AND METHOD FOR PRODUCING NOBLE GAS HYDRIDE

(71) Applicant: TOKYO UNIVERSITY OF SCIENCE FOUNDATION, Tokyo (JP)

(72) Inventor: Kazuo Watanabe, Tokyo (JP)

(73) Assignee: TOKYO UNIVERSITY OF SCIENCE FOUNDATION, Tokyo (JP)

( * ) Notice: Subject to any disclaimer, the term of this patent is extended or adjusted under 35 U.S.C. 154(b) by 657 days.

(21) Appl. No.: 17/624,939

(22) PCT Filed: Jul. 6, 2020

(86) PCT No.: PCT/JP2020/026472
§ 371 (c)(1),
(2) Date: Jan. 5, 2022

(87) PCT Pub. No.: WO2021/006248
PCT Pub. Date: Jan. 14, 2021

(65) Prior Publication Data
US 2022/0281746 A1    Sep. 8, 2022

(30) Foreign Application Priority Data
Jul. 5, 2019   (JP) ................................ 2019-126288

(51) Int. Cl.
*C01B 23/00*    (2006.01)
(52) U.S. Cl.
CPC ................................ *C01B 23/0005* (2013.01)
(58) Field of Classification Search
CPC .................................................. C01B 23/0005
See application file for complete search history.

(56) References Cited

U.S. PATENT DOCUMENTS

| 2001/0054601 A1 | 12/2001 | Ding |
| 2012/0264296 A1 | 10/2012 | Chern et al. |

FOREIGN PATENT DOCUMENTS

| JP | H10294315 A | 11/1998 |
| JP | 2003518324 A | 6/2003 |
| JP | 2007216095 A | 8/2007 |
| WO | 2005118137 A1 | 12/2005 |

OTHER PUBLICATIONS

Loubeyre et al., Physical Review Letters, (1994), 72(9), p. 1360-1363. (disclosed in IDS).*
Ishikawa et al., The physical Society of Japan, (2016), The Autumn Meeting, Abstract 14pAR-6. (disclosed in IDS).*
AI Overview of Google search "Noble gas hydride fuels release hydrogen energy", downloaded Sep. 26, 2024.*
Loubeyre et al., Physical Review Letters, (1994), 72(9), p. 1360-1363.*
P. Loubeyre et al., "Compression of Ar(H2)2 up to 175 GPa: A New Path for the Dissociation of Molecular Hydrogen?," 1994, Physical Review Letter, vol. 72, No. 9, 1360-1363. Retrieved from: <URL: https://journals.aps.org/prl/pdf/10.1103/PhysRevLett.72.1360>, 6 pages.
T. Ishikawa et al. "First-Principles Study of Superconductivity in Argon Hydrides," 2016, The Physical Society of Japan, The Autumn Meeting, Abstract 14pAR-6, Osaka Univ., Kanazawa Univ. Retrieved from: <URL: https://www.jstage.jst.go.jp/article/jpsgaiyo/71.2/0/71.2_1645/_pdf, https://www.jstage.jst.go.jp/article/psgaiyo/71.2/0/71.2_1645/_article/-char/ja/>, 2 pages.
Tanabe et al. "Growth Mechanism of Subsurface Argon Nanobubbles at Pd(111)," 2019, The Journal of Physical Chemistry, 123(13), 8256-8264.
Gray et al., "Production of Short-lived Molecules in a Mass Spectrometer," 1974, International Journal of Mass Spectrometry and Ion Physics, vol. 15, 121-131.
Kraas et al., "Rare Gas Hydrides in Rare Gas Matrices," 1992, Physica status solidi (a), vol. 130, pp. K229-K232.
Nesbitt, "High-Resolution Infrared Spectroscopy of Weakly Bound Molecular Complexes," 1988, Chemical Reviews, vol. 88, 843-870.
Ohmura et al., "Ignition and Burn Characteristics of D-3He-Fueled Fast Ignition Targets," 2008, Journal of Physics: Conference Series, vol. 112, 022068.
Kalinin et al., "Evidence for a bound HeH2 halo molecule by diffraction from a transmission grating," Jul. 8, 2004, Journal of Chemical Physics, vol. 121, No. 2, 625-627.
International Search Report of PCT/JP2020/026472, mailed Sep. 15, 2020, 8 pages.
Written Opinion of PCT/JP2020/026472, dated Jun. 29, 2021, 7 pages.
International Preliminary Report of PCT/JP2020/026472, dated Sep. 22, 2021, 13 pages.

* cited by examiner

*Primary Examiner* — Yong L Chu
(74) *Attorney, Agent, or Firm* — Brooks Kushman P.C.

(57) ABSTRACT

An embodiment of the present invention provides a noble gas hydride having the following formula 1: $Ng_nH_m$. In formula 1, Ng represents a noble gas atom, n represents an integer from 1-8, and m represents an integer from 1-46.

9 Claims, 37 Drawing Sheets

| Reactant Gas | Ion Dosage (cm⁻²) | m/e | Compositional Formula | Desorption Peak Temperature(s) (K) | TPD Spectrum |
|---|---|---|---|---|---|
| $H_2$ | $2 \times 10^{17}$ | 5 | $HeH$ | 700, 880, 930 |  |
| $H_2$ | $2 \times 10^{17}$ | 6 | $HeH_2$ | 700 |  |
| $H_2$ | $2 \times 10^{17}$ | 7 | $HeH_3$ | 470, 700 |  |
| $H_2$ | $2 \times 10^{17}$ | 8 | $HeH_4$ | 700 |  |

| Reactant Gas | Ion Dosage (cm⁻²) | m/z | Compositional Formula | Desorption Peak Temperature(s) (K) | TPD Spectrum |
|---|---|---|---|---|---|
| $H_2$ | $2 \times 10^{17}$ | 9 | $HeH_5$ | 700, 930 |  |
| $H_2$ | $2 \times 10^{17}$ | 10 | $HeH_6$ | 700, 930 |  |
| $H_2$ | $2 \times 10^{17}$ | 11 | $HeH_7$ | 700, 930 |  |
| $H_2$ | $2 \times 10^{17}$ | 13 | $HeH_9$ | 170, 280 |  |

FIG. 3

| Reactant Gas | Ion Dosage (cm⁻²) | m/z | Compositional Formula | Desorption Peak Temperature(s) (K) | TPD Spectrum |
|---|---|---|---|---|---|
| $H_2$ | $2 \times 10^{17}$ | 14 | $HeH_{10}$ | 160, 470, 580, 680 | 14 amu |
| $H_2$ | $2 \times 10^{17}$ | 15 | $HeH_{11}$ | 170, 480, 680 | 15 amu |
| $H_2$ | $2 \times 10^{17}$ | 16 | $HeH_{12}$ | 170, 690 | 16 amu |
| $H_2$ | $2 \times 10^{17}$ | 17 | $HeH_{13}$ | 170 | 17 amu |

| Reactant Gas | Ion Dosage (cm$^{-2}$) | m/z | Compositional Formula | Desorption Peak Temperature(s) (K) | TPD Spectrum |
|---|---|---|---|---|---|
| $H_2$ | $2 \times 10^{17}$ | 18 | $HeH_{14}$ | 170, 470, 680 |  |
| $H_2$ | $2 \times 10^{17}$ | 19 | $HeH_{15}$ | 170 |  |
| $H_2$ | $2 \times 10^{17}$ | 20 | $HeH_{16}$ | 170, 470, 680, 930 |  |
| $H_2$ | $2 \times 10^{17}$ | 21 | $HeH_{17}$ | 950 |  |

| Reactant Gas | Ion Dosage (cm⁻²) | m/s | Compositional Formula | Desorption Peak Temperature(s) (K) | TPD Spectrum |
|---|---|---|---|---|---|
| $H_2$ | $2 \times 10^{17}$ | 22 | $HeH_{18}$ | 170, 420, 680, 950 |  |
| $H_2$ | $2 \times 10^{17}$ | 23 | $HeH_{19}$ | 950 |  |
| $H_2$ | $2 \times 10^{17}$ | 24 | $HeH_{20}$ | 170, 280, 950 |  |
| $H_2$ | $2 \times 10^{17}$ | 25 | $HeH_{21}$ | 170, 260, 1150 |  |

| Reactant Gas | Ion Dosage (cm$^{-2}$) | m/e | Compositional Formula | Desorption Peak Temperature (a) (K) | TPD Spectrum |
|---|---|---|---|---|---|
| $H_2$ | $2 \times 10^{17}$ | 26 | $HeH_{22}$ | 170, 280, 690, 1160 |  |
| $H_2$ | $2 \times 10^{17}$ | 27 | $HeH_{23}$ | 150, 170, 270, 470, 680, 1170 |  |
| $H_2$ | $2 \times 10^{17}$ | 28 | $HeH_{24}$ | 170, 480, 690, 980 |  |
| $H_2$ | $2 \times 10^{17}$ | 29 | $HeH_{25}$ | 140, 180, 480, 680, 980 |  |
| $H_2$ | $2 \times 10^{17}$ | 30 | $HeH_{26}$ | 140, 170, 480, 680 |  |

| Reactant Gas | Ion Dosage (cm⁻²) | m/z | Compositional Formula | Desorption Peak Temperature(s) (K) | TPD Spectrum |
|---|---|---|---|---|---|
| $H_2$ | $2 \times 10^{17}$ | 31 | $HeH_{27}$ | 140, 170, 480, 680 |  |
| $H_2$ | $2 \times 10^{17}$ | 32 | $HeH_{28}$ | 160, 280, 700 |  |
| $H_2$ | $2 \times 10^{17}$ | 33 | $HeH_{29}$ | 690, 910 |  |
| $H_2$ | $2 \times 10^{17}$ | 34 | $HeH_{30}$ | 170, 680, 910 |  |

| Reactant Gas | Ion Dosage (cm⁻²) | m/e | Compositional Formula | Desorption Peak Temperature (K) | TPD Spectrum |
|---|---|---|---|---|---|
| $H_2$ | $2 \times 10^{16}$ | 21 | $^{20}NeH$ | 900, 1050 |  |
| $H_2$ | $2 \times 10^{16}$ | 23 | $^{22}NeH$ | 900, 1050 |  |
| $H_2$ | $2 \times 10^{16}$ | 24 | $^{20}NeH_4$, $^{22}NeH_2$ | 150, 320, 900, 1150 |  |
| $H_2$ | $2 \times 10^{16}$ | 25 | $^{20}NeH_5$, $^{22}NeH_3$ | 170, 280, 1170 |  |

FIG. 9

| Reactant Gas | Ion Dosage (cm⁻²) | m/e | Compositional Formula | Desorption Peak Temperature (K) | TPD Spectrum |
|---|---|---|---|---|---|
| $H_2$ | $2\times10^{16}$ | 26 | $^{20}NeH_6$, $^{22}NeH_4$ | 170, 280, 1160 | 26 amu |
| $H_2$ | $2\times10^{16}$ | 27 | $^{20}NeH_7$, $^{22}NeH_5$ | 170, 280, 1160 | 27 amu |
| $H_2$ | $2\times10^{16}$ | 29 | $^{20}NeH_9$, $^{22}NeH_7$ | 140, 170, 280, 400, 1170 | 29 amu |
| $H_2$ | $2\times10^{16}$ | 30 | $^{20}NeH_{10}$, $^{22}NeH_8$ | 160, 500 | 30 amu |

FIG. 10

| Reactant Gas | Ion Dosage (cm⁻²) | m/e | Compositional Formula | Desorption Peak Temperature (K) | TPD Spectrum |
|---|---|---|---|---|---|
| $H_2$ | $2 \times 10^{16}$ | 31 | $^{20}NeH_{11}$, $^{22}NeH_9$ | 220 | 31 amu |
| $H_2$ | $2 \times 10^{16}$ | 32 | $^{20}NeH_{12}$, $^{22}NeH_{10}$ | 180 | 32 amu |
| $H_2$ | $2 \times 10^{16}$ | 33 | $^{20}NeH_{13}$, $^{22}NeH_{11}$ | 170, 780 | 33 amu |
| $H_2$ | $2 \times 10^{16}$ | 34 | $^{20}NeH_{14}$, $^{22}NeH_{12}$ | 780 | 34 amu |

| Reactant Gas | Ion Dosage (cm$^{-2}$) | m/e | Compositional Formula | Desorption Peak Temperature (K) | TPD Spectrum |
|---|---|---|---|---|---|
| $H_2$ | $2\times10^{16}$ | 35 | $^{20}NeH_{15}$, $^{22}NeH_{13}$ | 870 |  |
| $H_2$ | $2\times10^{16}$ | 36 | $^{20}NeH_{16}$, $^{22}NeH_{14}$ | 120, 160, 780 |  |
| $H_2$ | $2\times10^{16}$ | 37 | $^{20}NeH_{17}$, $^{22}NeH_{15}$ | 120, 160, 780 |  |
| $H_2$ | $2\times10^{16}$ | 38 | $^{20}NeH_{18}$, $^{22}NeH_{16}$ | 120, 160, 820 |  |

| Reactant Gas | Ion Dosage (cm⁻²) | m/e | Compositional Formula | Desorption Peak Temperature (K) | TPD Spectrum |
|---|---|---|---|---|---|
| $H_2$ | $2 \times 10^{16}$ | 39 | $^{20}NeH_{19}$, $^{22}NeH_{17}$ | 120, 160, 820 |  |
| $H_2$ | $2 \times 10^{16}$ | 40 | $^{20}NeH_{20}$, $^{22}NeH_{18}$ | 120, 160, 340, 820 |  |
| $H_2$ | $2 \times 10^{16}$ | 41 | $^{20}NeH_{21}$, $^{22}NeH_{19}$ | 120, 160, 280 |  |
| $H_2$ | $2 \times 10^{16}$ | 42 | $^{20}NeH_{22}$, $^{22}NeH_{20}$ | 120, 160, 280 |  |

FIG. 13

| Reactant Gas | Ion Dosage (cm⁻²) | m/e | Compositional Formula | Desorption Peak Temperature (K) | TPD Spectrum |
|---|---|---|---|---|---|
| $H_2$ | $2 \times 10^{16}$ | 43 | $^{20}NeH_{23}$, $^{22}NeH_{21}$ | 120, 160 | |
| $H_2$ | $2 \times 10^{16}$ | 45 | $^{20}NeH_{25}$, $^{22}NeH_{23}$ | 200, 320 | |
| $H_2$ | $2 \times 10^{16}$ | 46 | $^{20}NeH_{26}$, $^{22}NeH_{24}$ | 200, 320 | |
| $H_2$ | $2 \times 10^{16}$ | 49 | $^{20}NeH_{29}$, $^{22}NeH_{27}$ | 160 | |

FIG. 14

| Reactant Gas | Ion Dosage (cm⁻²) | m/e | Compositional Formula | Desorption Peak Temperature (K) | TPD Spectrum |
|---|---|---|---|---|---|
| $D_2$ | $2\times10^{17}$ | 28 | $^{20}NeD_4/^{20}NeH_8$, $^{22}NeD_3/^{22}NeH_6$ | 180, 500, 1150 | 28 amu |
| $D_2$ | $4\times10^{16}$ | 60 | $^{20}NeD_{20}/^{20}NeH_{40}$, $^{22}NeD_{19}/^{22}NeH_{38}$ | 160 | 60 amu |

| Reactant Gas | Ion Dosage (cm⁻²) | m/e | Compositional Formula | Desorption Peak Temperature(s) (K) | TPD Spectrum |
|---|---|---|---|---|---|
| $H_2$ | $2\times10^{16}$ | 41 | $ArH$ | 150, 290 |  |
| $H_2$ | $2\times10^{16}$ | 42 | $ArH_2$ | 120, 150, 290 |  |
| $H_2$ | $2\times10^{16}$ | 43 | $ArH_3$ | 130, 160, 200, 310 |  |
| $H_2$ | $2\times10^{16}$ | 44 | $ArH_4$ | 170 |  |

| Reactant Gas | Ion Dosage (cm⁻²) | m/e | Compositional Formula | Desorption Peak Temperature (s) (K) | TPD Spectrum |
|---|---|---|---|---|---|
| $H_2$ | $3 \times 10^{14}$ | 44 | $ArH_4$ | 750 |  |
| $H_2$ | $3 \times 10^{14}$ | 45 | $ArH_5$ | 280, 750 |  |
| $H_2$ | $3 \times 10^{14}$ | 46 | $ArH_6$ | 750 |  |
| $H_2$ | $3 \times 10^{13}$ | 50 | $ArH_{10}$ | 160, 750 |  |

FIG. 17

| Reactant Gas | Ion Dosage (cm⁻²) | m/e | Compositional Formula | Desorption Peak Temperature(s) (K) | TPD Spectrum |
|---|---|---|---|---|---|
| $H_2$ | $2\times10^{16}$ | 51 | $ArH_{11}$ | 150 | |
| $H_2$ | $2\times10^{16}$ | 53 | $ArH_{13}$ | 150 | |
| $H_2$ | $2\times10^{16}$ | 55 | $ArH_{15}$ | 150, 1100 | |
| $H_2$ | $2\times10^{16}$ | 56 | $ArH_{16}$ | 150, 1050 | |

| Reactant Gas | Ion Dosage (cm⁻²) | m/e | Compositional Formula | Desorption Peak Temperature(s) (K) | TPD Spectrum |
|---|---|---|---|---|---|
| H₂ | 2×10¹⁶ | 57 | ArH₁₇ | 150, 200, 1050 |  |
| H₂ | 2×10¹⁶ | 58 | ArH₁₈ | 120, 290 |  |
| H₂ | 2×10¹⁶ | 67 | ArH₂₇ | 160, 190 |  |
| H₂ | 2×10¹⁶ | 68 | ArH₂₈ | 160, 190 (860 is noise) |  |

| Reactant Gas | Ion Dosage (cm⁻²) | m/e | Compositional Formula | Desorption Peak Temperature(s) (K) | TPD Spectrum |
|---|---|---|---|---|---|
| $H_2$ | $2 \times 10^{16}$ | 69 | $ArH_{29}$ | 160 |  |
| $H_2$ | $2 \times 10^{16}$ | 70 | $ArH_{30}$ | 160, 200 |  |
| $H_2$ | $2 \times 10^{16}$ | 71 | $ArH_{31}$ | 160, 220 |  |
| $H_2$ | $2 \times 10^{16}$ | 72 | $ArH_{32}$ | 150 |  |

| Reactant Gas | Ion Dosage (cm⁻²) | m/e | Compositional Formula | Desorption Peak Temperature(s) (K) | TPD Spectrum |
|---|---|---|---|---|---|
| $H_2$ | $2 \times 10^{16}$ | 83 | $ArH_{43}$, $(Ar_2H_3)$ | 160, 200 |  |
| $H_2$ | $2 \times 10^{16}$ | 84 | $ArH_{44}$, $(Ar_2H_4)$ | 160, 200 |  |
| $H_2$ | $2 \times 10^{16}$ | 85 | $ArH_{45}$, $(Ar_2H_5)$ | (160), 200 |  |
| $H_2$ | $2 \times 10^{16}$ | 86 | $ArH_{46}$, $(Ar_2H_6)$ | 160 |  |

FIG. 21

| Reactant Gas | Ion Dosage (cm⁻²) | m/e | Compositional Formula | Desorption Peak Temperature(s) (K) | TPD Spectrum |
|---|---|---|---|---|---|
| $D_2$ | $2 \times 10^{16}$ | 43 | $ArHD_2$, ($ArH_3$) | 130, 160, 200, 290, 330 | 43 amu |
| $D_2$ | $2 \times 10^{16}$ | 46 | $ArD_3$, $ArD_2H_2$ | 130, 160, 210, 330 | 46 amu |
| $D_2$ | $2 \times 10^{16}$ | 47 | $ArD_3H$ | 130, 160, 200, 330 | 47 amu |
| $D_2$ | $2 \times 10^{16}$ | 48 | $ArD_4$ | 130, 160, 200, 230, 330 | 48 amu |

| Reactant Gas | Ion Dosage (cm⁻²) | m/e | Compositional Formula | Desorption Peak Temperature(s) (K) | TPD Spectrum |
|---|---|---|---|---|---|
| $D_2$ | $2 \times 10^{16}$ | 74 | $ArD_{17}, ArD_{16}H_2$ | 190 |  |
| $D_2$ | $2 \times 10^{16}$ | 75 | $ArD_{17}H$ | 190 |  |
| $D_2$ | $2 \times 10^{16}$ | 76 | $ArD_{18}$ | 190 |  |

| Reactant Gas | Ion Dosage (cm$^{-2}$) | m/e | Compositional Formula | Desorption Peak Temperature(s) (K) | TPD Spectrum |
|---|---|---|---|---|---|
| H$_2$ | 3×10$^{14}$ | 91 | $^{86}$KrH$_5$ | 700 |  |
| H$_2$ | 3×10$^{14}$ | 92 | $^{86}$KrH$_6$ (trace) | 700 |  |
| H$_2$ | 3×10$^{14}$ | 93 | $^{86}$KrH$_7$ (trace) | 700 |  |

| Reactant Gas | Ion Dosage (cm⁻²) | m/e | Compositional Formula | Desorption Peak Temperature (s) (K) | TPD Spectrum |
|---|---|---|---|---|---|
| $H_2$ | $3\times10^{14}$ | 41 | $ArH$ | 750 |  |
| $H_2$ | $3\times10^{14}$ | 43 | $ArH_3$ | 750 |  |
| $H_2$ | $3\times10^{14}$ | 45 | $ArH_5$ | 750 |  |
| $H_2$ | $3\times10^{14}$ | 58 | $ArH_{18}$ | 750 |  |

NOBLE GAS HYDRIDE, FUEL, AND METHOD FOR PRODUCING NOBLE GAS HYDRIDE

CROSS-REFERENCE TO RELATED APPLICATION

This application is the U.S. national phase of PCT Application No. PCT/JP2020/026472 filed on Jul. 6, 2020, which claims priority to Japanese Patent Application No. 2019-126288, filed on Jul. 5, 2019, which are hereby incorporated in their entireties by reference herein.

TECHNICAL FIELD

The present disclosure relates to a noble gas hydride, a fuel, and a method for producing a noble gas hydride.

BACKGROUND ART

Argon fluorine hydride (HArF) is the only known compound as a hydride molecule of argon, and it is supposed to be produced at cryogenic temperatures. Helium hydride ions (HeH$^+$) are known as hydride ions of noble gas, but helium hydride molecules having no charge (HeH) are not known.

It is known that a mixture of argon and molecular hydrogen forms a solid crystal with a composition of Ar(H$_2$)$_2$ at 43000 atm. which is a result of the regular incorporation of hydrogen molecules into the crystal lattice of argon (see, for example, Non-Patent Documents 1 and 2). Therefore, it is different from the hydride molecules of noble gases.

On the other hand, for example, as in Non-Patent Document 3, a technique that can induce surface distortion by forming nanobubbles near the surface of a metal through ion sputtering and ion implantation of a noble gas such as argon has been reported. Such a technique has been reported as a result of research on catalytic activity.

On the other hand, in recent years, the use of hydrogen as an alternative fuel to fossil fuels has been attracting attention due to the need to protect the global environment and to prevent fuel depletion. Hydrogen is not only useful for environmental improvement in that it can extract heat energy without emitting carbon dioxide, but it is also useful as a fuel that can extract electricity through an electrochemical reaction with oxygen.

Therefore, in anticipation of the expansion of hydrogen use, the urgent development of infrastructure related to the storage and transportation of hydrogen is desired.

Non-Patent Document 1: P. Loubeyre et al., Phys. Rev. Lett. 72, 1360 (1994), <https://journals.aps.org/prl/pdf/10.1103/PhysRevLett.72.1360>

Non-Patent Document 2: "First-Principles Study of Superconductivity in Argon Hydrides," Takahiro Ishikawa, Akitaka Nakanishi, Katsuya Shimizu, and Tatsuki Oda.<https://www.jstage.jst.go.jp/article/jpsgaiyo/71.2/0/71.2_1645/_pdf, https://www.jstage.jst.go.jp/article/jpsgaiyo/71.2/0/71.2_1645/_article/-char/ja/>

Non-Patent Document 3: "Growth Mechanism of Subsurface Argon Nanobubbles at Pd(111)", Hiroki Tanabe, Kazutaka Hayashi. Shun Hosoi, Naoki Hama, Yukie Yokota. and Kazuo Watanabe. J. Phys. Chem. C, 123(13), p. 8256-8264 (2019).

SUMMARY OF INVENTION

Technical Problem

Various compounds that can stably store hydrogen, including hydrogen storage alloys, have been proposed, but the provision of compounds that make hydrogen easier to handle and use is considered to be a useful technique that will contribute to the expansion of hydrogen use.

In addition, in handling hydrogen, methods of storing and transporting hydrogen have been proposed, such as storing hydrogen in a gaseous state by pressurizing it into tanks or the like, or storing it in the form of hydrogenated compounds. However, in the former, there is still a concern that hydrogen itself is not as safe as fossil fuels, and in the latter, there is room for improvement in terms of the amount of hydrogen that can be stored and the ease of extraction of hydrogen.

For these reasons, the technique for the storage and transportation of hydrogen has not yet been established.

The disclosure has been made in view of the above.

An embodiment of the present invention is to provide a novel noble gas hydride and a method for producing the same.

Another embodiment of the invention is to provide a fuel that can replace fossil fuels and is easy to handle.

Solution to Problem

Specific means for solving the problem include the following aspects.

<1> A noble gas hydride represented by the following Formula 1:

$$Ng_nH_m \qquad \text{Formula 1}$$

In Formula 1, Ng represents a noble gas atom, n is an integer of from 1 to 8, and m is an integer of from 1 to 46.

<2> The noble gas hydride according to <1>, in which the noble gas atom is helium, neon, argon, or krypton.

<3> The noble gas hydride according to <1> or <2>, in which n is from 1 to 3 and m is from 1 to 18.

<4> A fuel including the noble gas hydride described in any one of <1> to <3>.

<5> A method for producing a noble gas hydride, including: bringing a surface of a metal or a metal oxide into contact with a noble gas to perform at least one of adsorption of noble gas atoms to the surface or occlusion of noble gas atoms into the interior of the metal or the metal oxide, and bringing the noble gas atoms present at at least one of the surface or the interior into contact with hydrogen atoms.

<6> The method for producing a noble gas hydride according to <5>, in which the hydrogen atoms are produced by bringing the metal or the metal oxide into contact with a hydrogen-containing gas.

<7> A method for producing a noble gas hydride, including: bringing a metal or a metal oxide into contact with a hydrogen-containing gas to allow hydrogen atoms to be present at at least one of a surface or interior of the metal or the metal oxide; and bringing the hydrogen atoms present on the metal or the metal oxide into contact with a noble gas.

<8> A method for producing a noble gas hydride, including supplying both a hydrogen-containing gas and a noble gas to the surface of a metal or a metal oxide, and bringing hydrogen atoms and noble gas atoms into contact with each other on a surface of the metal or the metal oxide.

<9> The method for producing a noble gas hydride according to any one of <5> to <8>, in which the metal or the metal of the metal oxide includes at least one of nickel, copper, or palladium.

<10> The method for producing a noble gas hydride according to any one of <5> to <9>, in which the noble gas atom is helium, neon, argon, krypton, or xenon.

<11> The method for producing a noble gas hydride according to any one of <5> to <10>, including heating the metal or the metal oxide before or after contact between noble gas atoms or a noble gas and hydrogen atoms, or simultaneously with contact between noble gas atoms or a noble gas and hydrogen atoms.

Advantageous Effects of Invention

An embodiment of the invention provides a novel noble gas hydride and a method for producing the same.

Another embodiment of the invention provides a fuel that can replace fossil fuels and is easy to handle.

BRIEF DESCRIPTION OF DRAWINGS

FIG. 3 shows a list of the compositions of helium hydrides produced by the production method according to the first aspect, and their production conditions and TPD spectral data.

FIG. 9 shows a list of the compositions of neon hydrides produced by the production method according to the first aspect, and their production conditions and TPD spectral data.

FIG. 10 shows a list of the compositions of neon hydrides produced by the production method according to the first aspect, and their production conditions and TPD spectral data.

FIG. 13 shows a list of the compositions of neon hydrides produced by the production method according to the first aspect, and their production conditions and TPD spectral data.

FIG. 14 shows a list of the compositions of neon hydrides produced by the production method according to the first aspect, and their production conditions and TPD spectral data.

FIG. 17 shows a list of the compositions of argon hydrides produced by the production method according to the first aspect, and their production conditions and TPD spectral data.

FIG. 21 shows a list of the compositions of argon hydrides produced by the production method according to the first aspect, and their production conditions and TPD spectral data.

DESCRIPTION OF EMBODIMENTS

Figure 1:
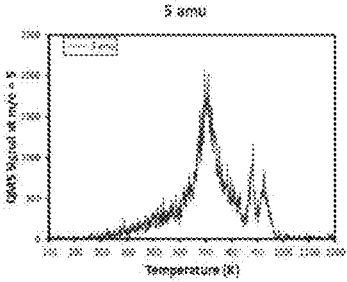
FIG. 1 shows a list of the compositions of helium hydrides produced by the production method according to the first aspect, and their production conditions and TPD spectral data.
Figure 1:
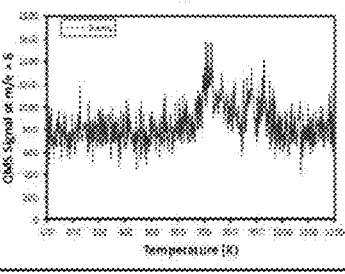
Figure 1:
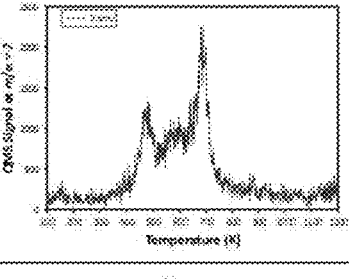
Figure 1:
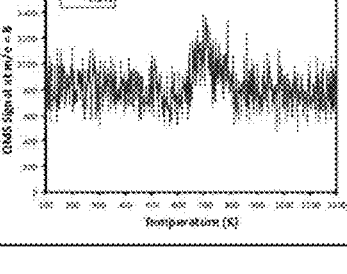
Figure 2:
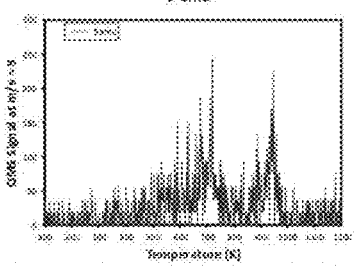
FIG. 2 shows a list of the compositions of helium hydrides produced by the production method according to the first aspect, and their production conditions and TPD spectral data.
Figure 2:
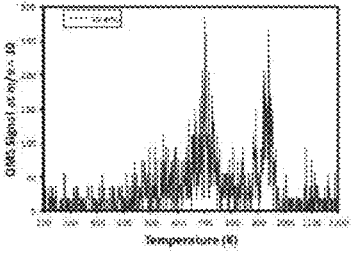
Figure 2:
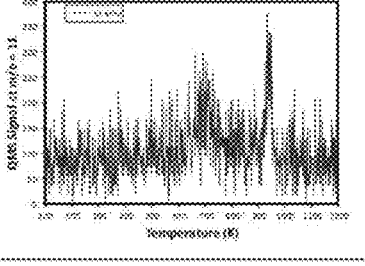
Figure 2:
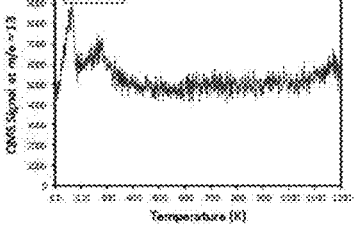
Figure 4:
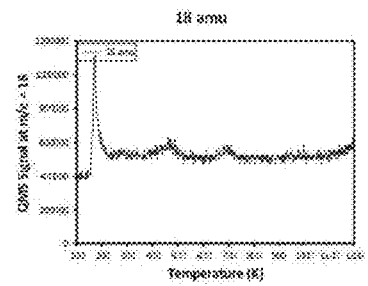
FIG. 4 shows a list of the compositions of helium hydrides produced by the production method according to the first aspect, and their production conditions and TPD spectral data.
Figure 4:
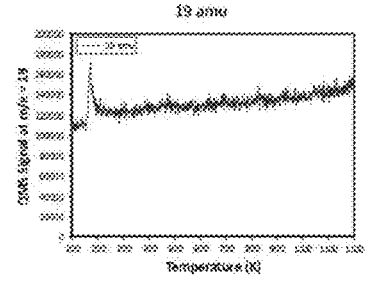
Figure 4:
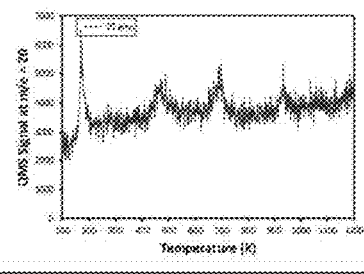
Figure 4:
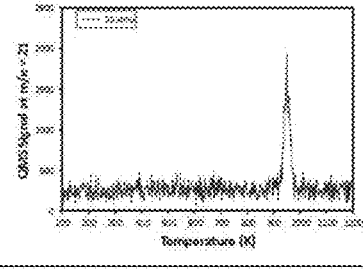
Figure 5:
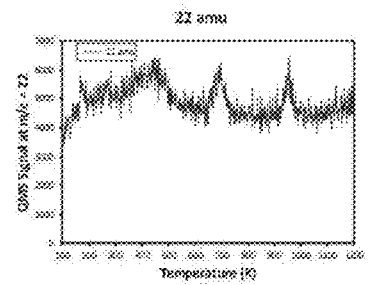
FIG. 5 shows a list of the compositions of helium hydrides produced by the production method according to the first aspect, and their production conditions and TPD spectral data.
Figure 5:
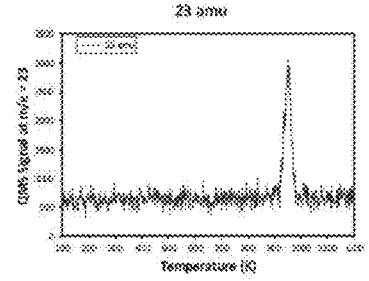
Figure 5:
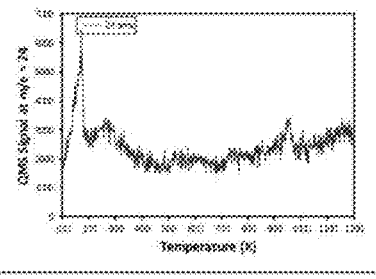
Figure 5:
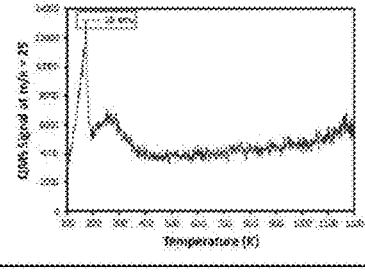
Figure 6:
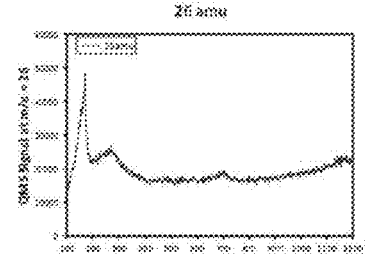
FIG. 6 shows a list of the compositions of helium hydrides produced by the production method according to the first aspect, and their production conditions and TPD spectral data.
Figure 6:
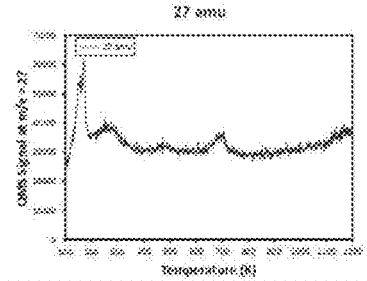
Figure 6:
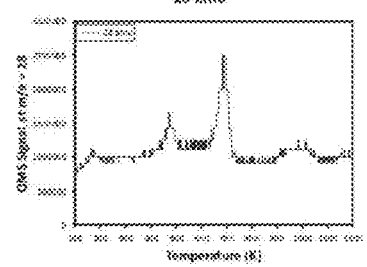
Figure 6:
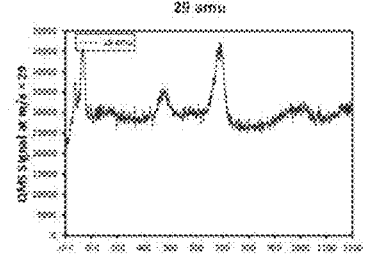
Figure 6:
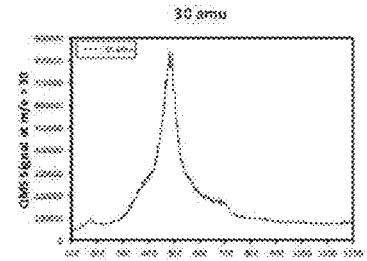
Figure 7:
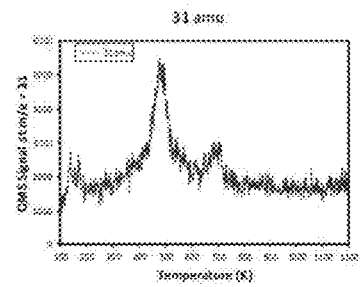
FIG. 7 shows a list of the compositions of helium hydrides produced by the production method according to the first aspect, and their production conditions and TPD spectral data.
Figure 7:
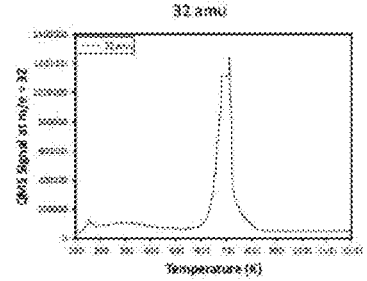
Figure 7:
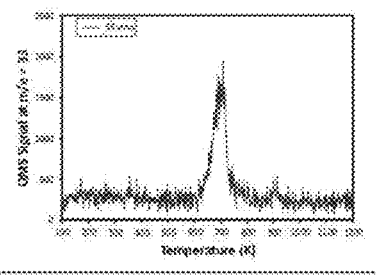
Figure 7:
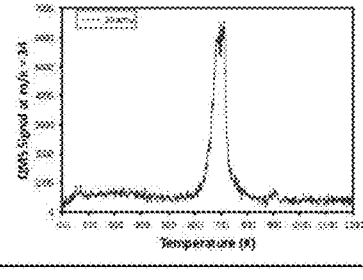
Figure 8:
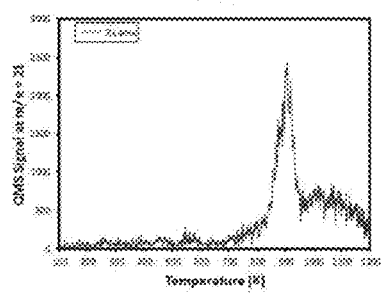
FIG. 8 shows a list of the compositions of neon hydrides produced by the production method according to the first aspect, and their production conditions and TPD spectral data.
Figure 8:
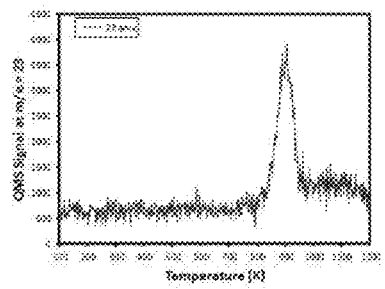
Figure 8:
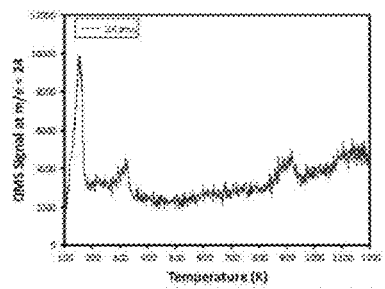
Figure 8:
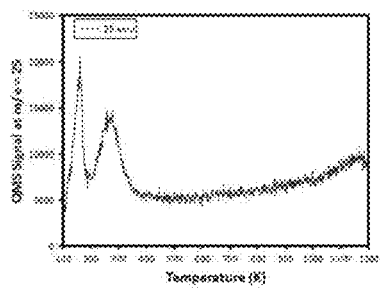
Figure 11:
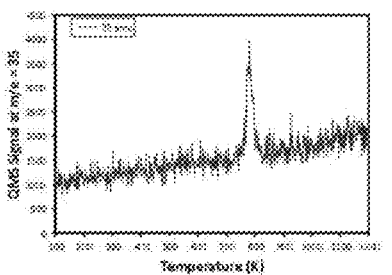
FIG. 11 shows a list of the compositions of neon hydrides produced by the production method according to the first aspect, and their production conditions and TPD spectral data.
Figure 11:
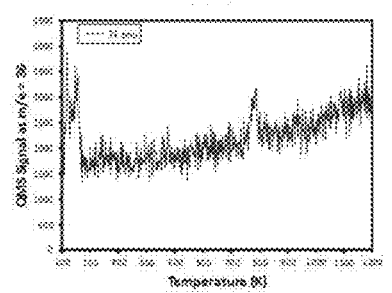
Figure 11:
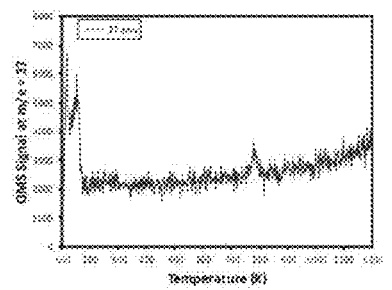
Figure 11:
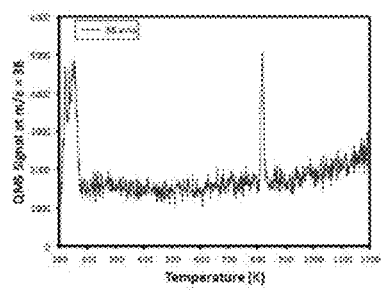
Figure 12:
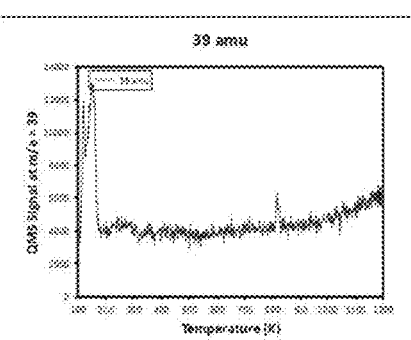
FIG. 12 shows a list of the compositions of neon hydrides produced by the production method according to the first aspect, and their production conditions and TPD spectral data.
Figure 12:
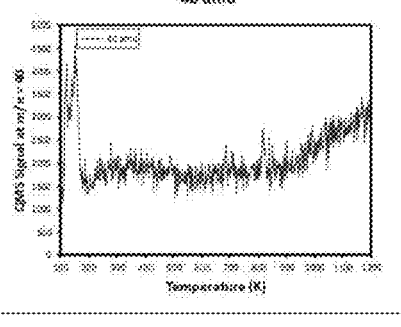
Figure 12:
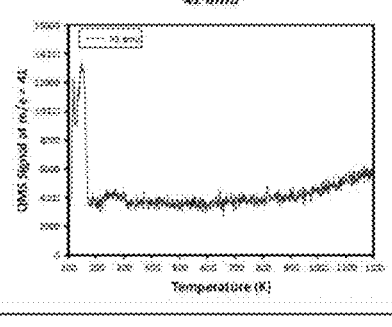
Figure 12:
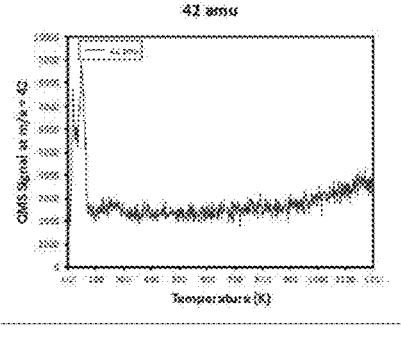
Figure 15:
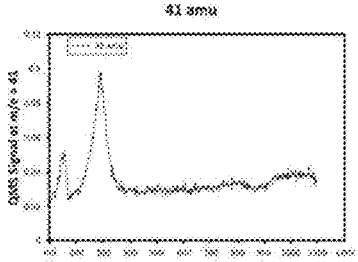
FIG. 15 shows a list of the compositions of argon hydrides produced by the production method according to the first aspect, and their production conditions and TPD spectral data.
Figure 15:
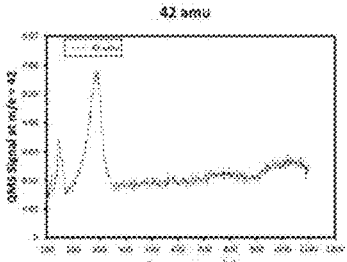
Figure 15:
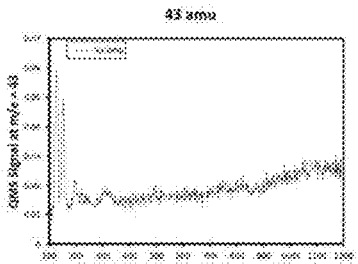
Figure 15:
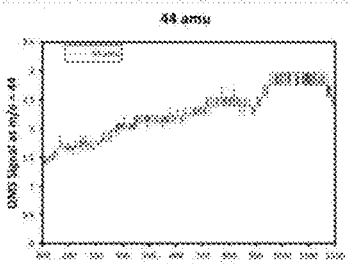
Figure 16:
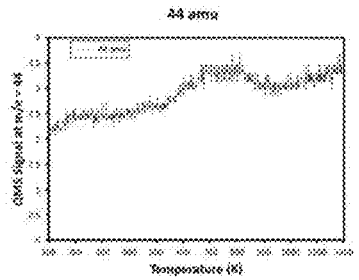
FIG. 16 shows a list of the compositions of argon hydrides produced by the production method according to the first aspect, and their production conditions and TPD spectral data.
Figure 16:
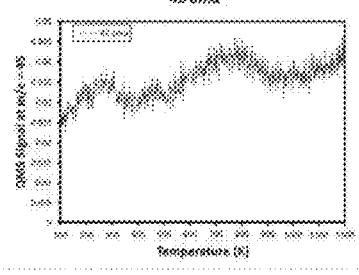
Figure 16:
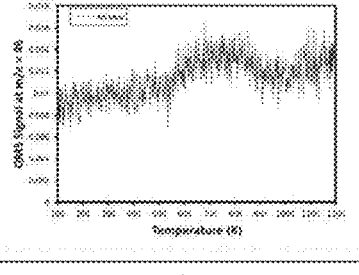
Figure 16:
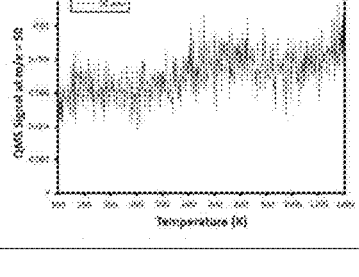
Figure 18:
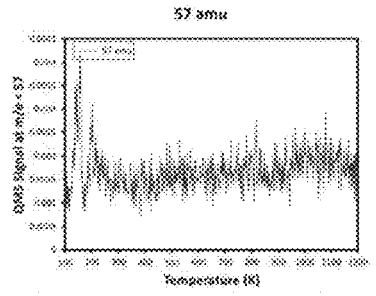
FIG. 18 shows a list of the compositions of argon hydrides produced by the production method according to the first aspect, and their production conditions and TPD spectral data.
Figure 18:
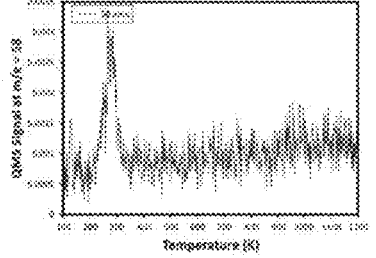
Figure 18:
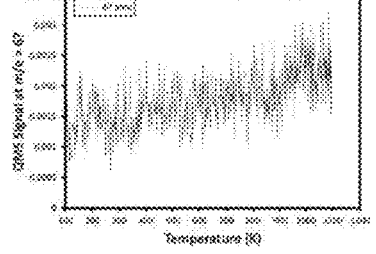
Figure 18:
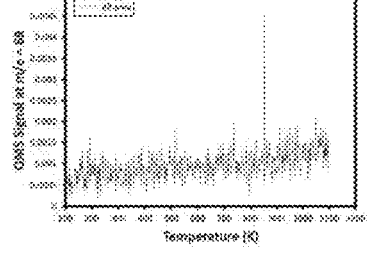
Figure 19:
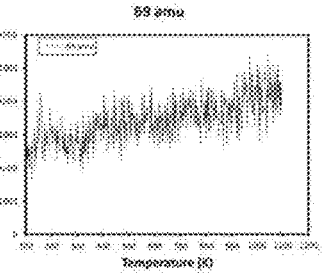
FIG. 19 shows a list of the compositions of argon hydrides produced by the production method according to the first aspect, and their production conditions and TPD spectral data.
Figure 19:
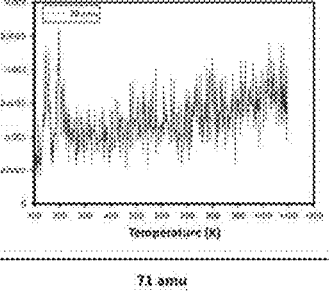
Figure 19:
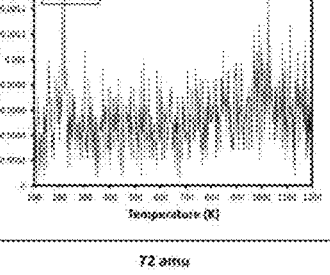
Figure 19:
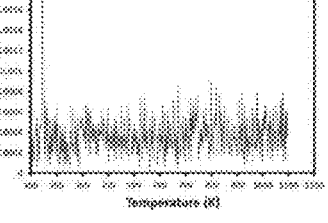
Figure 20:
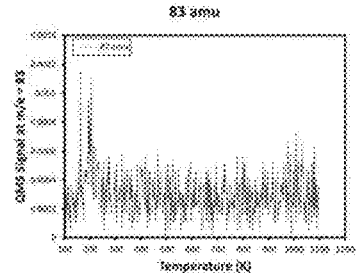
FIG. 20 shows a list of the compositions of argon hydrides produced by the production method according to the first aspect, and their production conditions and TPD spectral data.
Figure 20:
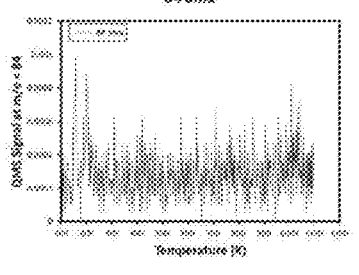
Figure 20:
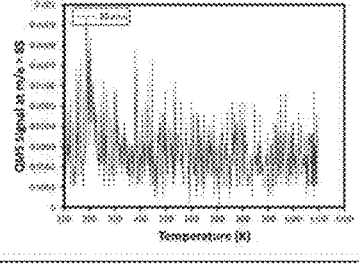
Figure 20:
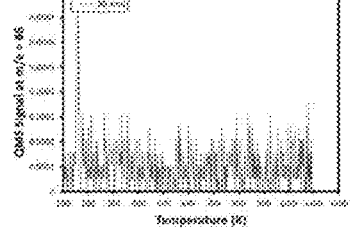
Figure 22:
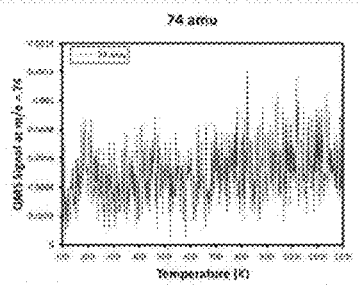
FIG. 22 shows a list of the compositions of argon hydrides produced by the production method according to the first aspect, and their production conditions and TPD spectral data.
Figure 22:
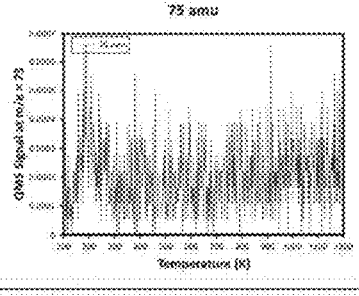
Figure 22:
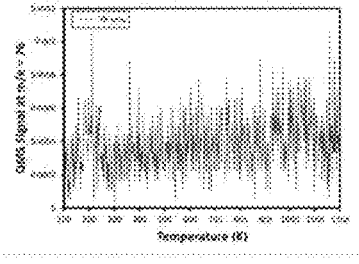

Hereinafter, the noble gas hydride, the method for producing the same, and the fuel of the disclosure will be described in detail.

The following description of the component requirements may be based on representative aspects of the disclosure, but the disclosure is not limited to such embodiments.

In the disclosure, "to" indicating a numerical range is used in a sense that includes the numerical values described before and after it as the lower and upper limits.

In the numerical ranges described stepwise in the disclosure, the upper or lower limits described in one numerical range may be replaced by the upper or lower limit of another stepwise described numerical range. In the numerical ranges described in the disclosure, the upper or lower limit of the numerical ranges may be replaced by the values shown in Examples.

In the disclosure, the term "step" includes not only an independent step but also a step that cannot be clearly distinguished from other steps as long as the intended purpose of the step is achieved.

In the fuel according to the disclosure, when a plurality of substances corresponding to each component are present in the fuel, the amount of each component in the fuel means the total amount of the plurality of substances present in the fuel unless otherwise specified.

In the disclosure, a combination of preferable aspects is a more preferable aspect.

<Noble Gas Hydride>

The noble gas hydride of the disclosure is a novel compound represented by Formula 1.

Noble gas is also referred to as rare gas or rare gas.

$$Ng_nH_m \quad \text{Formula 1}$$

In Formula 1. Ng represents a noble gas atom.

Examples of the noble gas atom include helium, neon, argon, krypton, xenon, and radon. Among these elements, helium (He), neon (Ne), argon (Ar), or krypton (Kr) is preferable, and He, Ne, or Ar is more preferable.

In Formula 1, n represents an integer of from 1 to 8.

The n may be an integer of from 1 to 4, an integer of from 1 to 3, or an integer of from 1 to 2.

In Formula 1, m is an integer of from 1 and 46.

The m may be an integer of from 1 to 32 or an integer of from 1 to 18.

Among the above, in Formula 1, n is preferably from 1 to 3, and m is preferably from 1 to 18.

Examples of the noble gas hydride of the disclosure include helium hydride ($He_{n1}H_m$, $He_8H_2$), neon hydride ($Ne_{n1}H_m$), argon hydride ($Ar_{n1}H_m$), krypton hydride ($Kr_{n1}H_m$), and xenon hydride ($Xe_{n1}H_m$).

In each chemical formula, m has the same meaning as m in Formula 1, and n1 represents 1 or 2.

The noble gas hydride of the disclosure may be a single compound, or may be a mixture of a plurality of molecules that differ in the types and numbers of noble gases (n in Formula 1) or the numbers of hydrogen atoms (m in Formula 1).

When the noble gas hydride is present alone, it may be produced by direct hydrogenation or isolated from a mixture or other source.

When the noble gas hydride is a mixture of a plurality of molecules (hydrides) that differ in at least one of the noble gas types and the number of hydrogen atoms, it is possible to separate and isolate them by using the difference in liquefaction temperature of each hydride.

When the noble gas hydride is a mixture, the mixing ratio of hydrides in the mixture can be adjusted according to the reaction conditions during production (for example, ratio of reactants, ion irradiation amount, and temperature).

Specific examples of the noble gas hydride of the disclosure are shown below.

However, the noble gas hydride of the disclosure is not limited to these specific examples.

In the case of helium hydride ($He_{n1}H_m$), m is preferably from 1 to 30, and may be from 1 to 25 or from 1 to 7.

Examples of helium hydride include HeH, $HeH_2$, $HeH_3$, $HeH_4$, $HeH_5$, $HeH_6$, $HeH_7$, . . . , $HeH_{30}$, and $He_8H_2$.

In the case of neon hydride ($Ne_{n1}H_m$), m is preferably from 1 to 29, and may be from 1 to 23 or from 1 to 9.

Examples of neon hydride include $^{20}NeH$, $^{20}NeH_4$, $^{20}NeH_5$, $^{20}NeH_7$, . . . , $NeH_{29}$, and $^{22}NeH_2$, $^{22}NeH_3$, $^{22}NeH_4$, $^{22}NeH_5$, . . . , and $^{22}NeH_{27}$.

In the case of argon hydride ($Ar_{n1}H_m$), m is preferably from 1 to 46, and may be from 1 to 32 or from 1 to 18.

Examples of argon hydride include ArH, $ArH_2$, $ArH_3$, $ArH_4$, $ArH_5$, $ArH_6$, . . . , $ArH_{18}$, . . . , $ArH_{46}$, and $Ar_2H_6$.

In the case of krypton hydride ($Kr_{n1}H_m$), m is preferably from 5 to 7.

Examples of krypton hydride include $KrH_5$, $KrH_6$, and $KrH_7$.

In the case of xenon hydride ($Xe_{n1}H_m$), m is preferably from 1 to 2.

Examples of xenon hydride include XeH and $XeH_2$.

<Method for Producing Noble Gas Hydride>

The noble gas hydride of the disclosure may be produced by any method that yields a compound with a composition that satisfies Formula 1 above. The noble gas hydride of the disclosure is preferably produced by a method in which noble gas atoms and hydrogen atoms are brought into contact with each other on the surface and/or near the surface of a metal or a metal oxide (that is, the interior of the metal or the metal oxide), thereby hydrogenating the noble gas to form a hydride.

The method for obtaining a noble gas hydride by bringing a noble gas into contact with hydrogen atoms is not particularly limited, and is more preferably the production method according to a first aspect, second aspect, or third aspect described below (the method for producing a noble gas hydride of the disclosure).

The method for producing a noble gas hydride of the disclosure is described in detail below.

The method for producing a noble gas hydride according to a first aspect includes: bringing the surface of a metal or a metal oxide into contact with a noble gas to perform at least one of adsorption of noble gas atoms to the surface of the metal or the metal oxide or occlusion of noble gas atoms into the interior of the metal or the metal oxide (hereinafter noble gas contact step); and bringing the noble gas atoms present on at least one of the surface or interior into contact with hydrogen atoms (hereinafter the first hydrogenation step).

In a first aspect, at first, noble gas atoms are allowed to present on a metal or a metal oxide, and then brought into contact with hydrogen atoms to obtain a noble gas hydride.

The method for producing a noble gas hydride according to a second aspect includes: bringing a metal or a metal oxide into contact with a hydrogen-containing gas to allow hydrogen atoms to be present on at least one of the surface or interior of the metal or the metal oxide (hereinafter hydrogen contact step); and bringing the hydrogen atoms present on the metal or the metal oxide into contact with a noble gas (hereinafter second hydrogenation step).

In a second aspect, first, hydrogen atoms are allowed to be present on a metal or a metal oxide, and then brought into contact with a noble gas to obtain a noble gas hydride.

The method for producing a noble gas hydride according to a third aspect includes supplying both a hydrogen-containing gas and a noble gas to the surface of a metal or a metal oxide, and bringing hydrogen atoms and noble gas atoms into contact with each other on the surface of the metal or the metal oxide.

In the third aspect, hydrogen atoms and noble gas atoms are both (preferably simultaneously) brought into contact with a metal or a metal oxide to obtain a noble gas hydride.

Hereinafter, the methods for producing a noble gas hydride according to the first aspect, second aspect, and third aspect will be described in detail.

<First Aspect>

The method for producing a noble gas hydride according to a first aspect includes a noble gas contact step and a first hydrogenation step, and may include other configurations if necessary.

In the first aspect, noble gas atoms are stored, for example, on the surface and near the surface of a metal or a metal oxide (from the surface of the metal or the metal oxide to the interior of the metal or the metal oxide in the thickness direction), and hydrogen atoms, which are produced by, for example, the dissociation of hydrogen molecules on the surface of the metal or the metal oxide by contact with a hydrogen-containing gas, are brought into contact with the surface and its vicinity including the region where noble gas atoms are stored. This allows the hydrogen atoms to diffuse into the metal or the metal oxide and react with noble gas atoms stored, for example, on the surface or its vicinity of the metal or the metal oxide to produce a noble gas hydride.

The contact between noble gas atoms and hydrogen atoms may be performed under vacuum conditions.

Noble Gas Contact Step

In the noble gas contact step, the surface of a metal or a metal oxide is brought into contact with a noble gas to perform at least one of adsorption of noble gas atoms to the surface of the metal or the metal oxide or occlusion of noble gas atoms into the interior of the metal or the metal oxide.

Examples of the metal include iron (Fe), cobalt (Co), nickel (Ni), copper (Cu), palladium (Pd), vanadium (V), magnesium (Mg), and alloys thereof. The metal preferably includes at least one of Ni, Cu, or Pd, and is more preferably Ni, Cu, or Pd, or an alloy thereof.

Examples of the metal oxide include oxides such as Fe, Co, Ni, Cu, Pd, V, and Mg. Examples of the metal oxide include FeO, $Fe_3O_4$, $Fe_2O_3$, CoO, $CO_2O_3$, $CoO_4$, NiO, $Ni_2O_3$, CuO. $Cu_2O$, PdO, $V_2O_5$, MgO, and $Mg_2O$.

The shape of the metal or the metal oxide is not particularly limited, may be, for example, a plate shape, a block shape, a spherical shape, or a granule, and is preferably a plate shape.

The thickness of the plate shape is not particularly limited, and may be selected as appropriate within the range that can withstand the treatment in each steps, such as the noble gas contact step and the first hydrogenation step, and the hydrogen contact step and the second hydrogenation step described below.

Examples of the noble gas atom include helium, neon, argon, krypton, xenon, and radon. Among them, helium (He), neon (Ne), argon (Ar), or krypton (Kr) is preferable, and He, Ne, or Ar is more preferable.

The noble gas atoms in the disclosure optionally include those in an ionized state and those in a plasma state.

Examples of the method of bringing a noble gas into contact with the surface of a metal or a metal oxide include a method of applying a noble gas to the surface of a metal or a metal oxide, a method of exposing a metal or a metal oxide to a noble gas atmosphere, and a method of irradiating the surface of a metal or a metal oxide with an ion beam of a noble gas.

Among the above methods, from the viewpoint of obtaining a state in which noble gas elements are stored and occluded in the interior of the substrate, a method of irradiating the surface of a metal or a metal oxide with an ion beam of a noble gas is preferable.

The amount of the noble gas when bringing the noble gas into contact with the surface of a metal or a metal oxide may be selected as appropriate according to the noble gas contact method.

For example, when an ion beam of a noble gas is irradiated to the surface of a metal or a metal oxide, the irradiation amount of noble gas ions (ion irradiation amount) may be selected according to the type of the noble gas, the purpose of adjusting the number of hydrogen atoms, or others. The ion irradiation amount may be, for example, from $1\times10^{13}$ ions/cm$^2$ to $1\times10^{18}$ ions/cm$^2$, and is preferably from $3\times10^{14}$ ions/cm$^2$ to $2\times10^{17}$ ions/cm$^2$.

The ion irradiation amount is a value obtained by measuring the number of ions per sample unit area (cm$^2$) with an ammeter, and can be measured using, for example, a digital multimeter PC 700 manufactured by Sanwa Electric Instrument Co., Ltd.

For example, when an ion beam of a noble gas is irradiated to the surface of a metal or a metal oxide, the angle at which the irradiated noble gas ions enter the surface of the metal or the metal oxide (angle of incidence) is preferably from 0° to 45°, and more preferably from 0° to 15° from the viewpoint of the depth at which the noble gas ions can enter.

For example, when an ion beam of a noble gas is irradiated to the surface of a metal or a metal oxide, the acceleration energy of the ion beam of the noble gas to be irradiated is preferably from 1000 V to 5000 V, and more preferably from 1000 V to 1700 V from the viewpoint of obtaining a state in which noble gas elements are embedded and occluded in the substrate.

The acceleration energy of the ion beam can be adjusted as appropriate by adjusting the voltage used to irradiate the ion beam by the ion sputtering method (ion impact method).

The temperature of the metal or the metal oxide when brought into contact with a noble gas is preferably from 50 K (Kelvin; hereinafter the same) to 200 K, and more preferably from 90 K to 120 K, from the viewpoint of suppressing thermal desorption of the noble gas, hydrogen atoms, or noble gas hydride.

The temperature of the metal or the metal oxide is a value obtained by measuring the temperature of the surface using a non-contact thermometer, thermocouple, or the like.

The composition of the noble gas hydride (the composition represented by $Ng_nH_m$ (Formula 1) described above) can be adjusted, for example, by the following (1) to (3).

(1) Irradiation Amount of Noble Gas Ions (Ion Irradiation Amount)

The composition of the noble gas hydride generated from the metal or the metal oxide can be changed by adjusting the amount ratio of hydrogen atoms to noble gas atoms. For example, depending on the irradiation amount of noble gas ions relative to the amount of hydrogen atoms, the hydride production temperature rises and falls, and the composition of the hydride produced also changes.

(2) Reaction Temperature

The composition of the hydride produced changes depending on the reaction temperature (for example, the temperature of the metal or the metal oxide) when the hydrogen atoms react with noble gas atoms.

(3) Contact Amount of Hydrogen Molecules or Hydrogen-Containing Gas

The ratio of reacting hydrogen atoms to noble gas atoms can be changed by adjusting the amount of the hydrogen molecules or hydrogen-containing gas that brought into contact with the metal or the metal oxide. This also changes the composition of the hydride produced.

Adsorption of a noble gas to the surface means that the noble gas adheres to the surface of a metal or a metal oxide due to van der Waals force between the noble gas and the metal or the metal oxide.

The occlusion of noble gas atoms into a metal or a metal oxide means that noble gas atoms enter and are stored inside the metal or the metal oxide.

This state may be, for example, a state in which a metal or metal oxide is irradiated with noble gas ions (for example, Ar$^+$ ions), and neutralized noble gas atoms (for example, Ar atoms) enter the interior of the metal or the metal oxide, forming a bubbling region (for example, Ar nanobubbles) in which the noble gas is concentrated. The irradiation of a noble gas can be performed by ion sputtering. In the area irradiated with a noble gas, a nanobubble structure of noble gas atoms formed by noble gas ions entering and agglomerating inward from the surface of the metal or the metal oxide is formed, and the nanobubble structure causes a distorted surface to appear, resulting in protrusions.

The nanobubble structure can be confirmed by local surface observation using a scanning tunneling microscope (STM).

The state of adsorption and occlusion of the noble gas can be confirmed by a temperature programmed desorption (TPD) method.

When a noble gas is adsorbed to the surface of a metal or a metal oxide, the amount of noble gas atoms adsorbed is preferably from 0.1 to 0.9, and more preferably from 0.2 to 0.8 in terms of the coverage (that is, the ratio of the number of adsorbed species (noble gas atoms) to the number of atoms on the surface), from the viewpoint of ease of hydrogenation of the noble gas atoms.

When the noble gas atoms are occluded in a metal or a metal oxide, the amount of noble gas atoms occluded is preferably from $1\times10^{13}$ ions/cm$^2$ to $1\times10^{18}$ ions/cm$^2$, and more preferably from $3\times10^{14}$ ions/cm$^2$ to $2\times10^{17}$ ions/cm$^2$ in terms of the ion irradiation amount, from the viewpoint of ease of hydrogenation of the noble gas atoms.

The amount of noble gas atoms adsorbed to or occluded in the metal or the metal oxide is the value measured by the temperature programmed desorption (TPD) method.

First Hydrogenation Step

In the first hydrogenation step, noble gas atoms present on at least one of the surface or interior of the metal or the metal oxide are brought into contact with hydrogen atoms.

The method of bringing noble gas atoms and hydrogen atoms into contact with each other may be any method that allows the hydrogen atoms to act on the noble gas atoms present on the metal or the metal oxide.

For example, a hydrogen-containing gas may be directly applied to a metal or a metal oxide on which noble gas atoms are present, and the hydrogen atoms produced by the dissociation of hydrogen molecules in the hydrogen-containing gas on the surface of the metal or the metal oxide may come into contact with the noble gas. As described above, the hydrogen atoms are preferably produced by bringing a metal or a metal oxide into contact with a hydrogen-containing gas.

In another method, for example, hydrogen atoms obtained by dissociating hydrogen molecules in advance are exposed to a metal or a metal oxide on which noble gas atoms are present, thereby bringing the hydrogen atoms into contact with the noble gas. When hydrogen molecules are dissociated in advance, hydrogen molecules may be dissociated by bringing a hydrogen-containing gas into contact with a heated metal filament.

In another method, for example, hydrogen molecules are converted into hydrogen molecular ions $H_2^+$ by electron beams from a heated metal filament, and the $H_2^+$ is accelerated by applying an electric field to it, and then irradiated to a metal or a metal oxide on which noble gas atoms are present, thereby bringing the hydrogen atoms into contact with the noble gas.

The hydrogen-containing gas may be any gas that contains hydrogen, and may be a gas consisting of hydrogen only, or a mixture of hydrogen and other gaseous component (for example, nitrogen or carbon dioxide). In the case of a gas mixture, the hydrogen content ratio in the gas mixture is preferably 50/o or more, more preferably 80% or more, even more preferably 95% or more, and particularly preferably 98% or more with respect to the total volume.

The amount of hydrogen atoms when bringing a noble gas into contact with hydrogen atoms (hydrogen exposure amount) may be selected as appropriate according to the method of contacting hydrogen atoms. When the surface is exposed to hydrogen molecules ($H_2$), the amount may be from 1000 L to 10000 L, and is preferably from 1000 L to 5000 L.

Note that 1 L (Langmuir) is $10^{-6}$ Torr·s, where 1 Torr=133.3 Pa (the same applies below).

The hydrogen exposure amount is a value obtained from the product of the exposure time of hydrogen exposure and the pressure value measured by an ionization vacuum gauge, and can be measured using, for example, AIG17G manufactured by AML.

It is preferable to heat the metal or the metal oxide before or after the contact between noble gas atoms and hydrogen atoms, or simultaneously with the contact between noble gas atoms and hydrogen atoms. Heating the metal or the metal oxide facilitates the dissociation of hydrogen molecules and the diffusion of hydrogen atoms, resulting in better hydrogenation of noble gas atoms. The temperature of the metal or the metal oxide when the noble gas atoms and hydrogen atoms are brought into contact with each other is preferably from 50 K to 500 K, and more preferably from 90 K to 120 K from the viewpoint of ease of dissociative adsorption of hydrogen molecules and diffusion of hydrogen atoms.

The temperature of the metal or the metal oxide is a value obtained by measuring the temperature of the surface using a non-contact thermometer, thermocouple, or the like.

<Second Aspect>

The method for producing a noble gas hydride according to a second aspect includes a hydrogen contact step and a second hydrogenation step, and may include other configurations as needed.

In the second aspect, contrary to the first aspect, hydrogen atoms are stored on, for example, the surface and its vicinity (the interior in the thickness direction from the surface) of the metal or the metal oxide, a noble gas is imparted, and the noble gas is brought into contact with the surface and its vicinity including the region where hydrogen atoms are stored. This allows noble gas atoms to diffuse into the metal or the metal oxide and react with hydrogen atoms stored, for example, on the surface or its vicinity of the metal or the metal oxide to produce noble gas hydrides.

Hydrogen Contact Step

In the hydrogen contact step, a metal or a metal oxide is brought into contact with hydrogen atoms to allow the hydrogen atoms to be present on at least one of the surface or interior of the metal or the metal oxide.

The details of the metal, the metal oxide, and noble gas are the same as in the first aspect described above, and the preferred aspect is also the same, so the explanation here is omitted.

The method of bringing a metal or a metal oxide into contact with hydrogen atoms may be any method that allows hydrogen atoms to be present on the surface or interior of a metal or a metal oxide.

For example, hydrogen atoms obtained by dissociating hydrogen molecules beforehand may be applied to the metal or the metal oxide to allow hydrogen atoms to be present on the surface or interior of the metal or the metal oxide.

When hydrogen molecules are dissociated in advance, hydrogen atoms may be obtained by dissociating hydrogen molecules by bringing a hydrogen-containing gas into contact with a heated metal filament.

Hydrogen atoms may be applied to a metal or a metal oxide using RF discharge (for example, an active atom/radical beam source PAR-114-20-AS manufactured by Pascal Co., Ltd.) or a hydrogen atom beam generator using the electron cyclotron resonance (ECR) method (for example, Atom Source manufactured by Adcap Vacuum Technology Co., Ltd.).

From the viewpoint of the ease of hydrogenation of noble gas atoms, the amount of hydrogen atoms present on the surface or interior of the metal or the metal oxide may be from 1 to 10, from 1 to 5, and preferably from 1 to 2 in terms of the coverage (that is, the ratio of the number of adsorbed species (hydrogen atoms) to the number of atoms on the surface).

The amount of hydrogen atoms present on the metal or the metal oxide is the value measured by the temperature programmed desorption (TPD) method.

Second Hydrogenation Step

In the second hydrogenation step, hydrogen atoms present on a metal or a metal oxide are brought into contact with a noble gas.

The method of bringing hydrogen atoms into contact with the noble gas may be any method that allows the noble gas to act on the hydrogen atoms present on the metal or the metal oxide.

For example, a noble gas may be applied directly to a metal or a metal oxide on which hydrogen atoms are present.

The amount of a noble gas (noble gas exposure amount) when bringing hydrogen atoms into contact with the noble gas may be from 1 L to 100 L, and is preferably from 1 L to 10 L. Note that 1 L (Langmuir) is $10^{-6}$ Torr·s.

The noble gas exposure amount is determined with an ionization vacuum gauge and may be measured using, for example, AIG17G manufactured by AML.

It is preferable to heat the metal or the metal oxide before or after the contact between hydrogen atoms and the noble gas, or simultaneously with the contact between hydrogen atoms and the noble gas. By heating the metal or the metal oxide, hydrogenation of the noble gas atoms can be performed favorably. The temperature of the metal or the metal oxide at the time of bringing hydrogen atoms into contact with the noble gas is preferably from 50 K to 500 K, and more preferably from 80 K to 120 K from the viewpoint of ease of dissociative adsorption of hydrogen molecules and diffusion of hydrogen atoms.

The temperature of the metal or the metal oxide is a value obtained by measuring the temperature of the surface using a non-contact thermometer, thermocouple, or the like.

<Third Aspect>

The method for producing a noble gas hydride according to a third aspect includes supplying both a hydrogen-containing gas and a noble gas to the surface of a metal or a metal oxide, and bringing hydrogen atoms and noble gas atoms into contact with each other on the surface of the metal or the metal oxide, and may include other configuration if necessary.

The details of the metal, the metal oxide, and noble gas are the same as in the first aspect described above, and the preferred aspect is also the same, so the explanation here is omitted.

The method of bringing hydrogen atoms and noble gas atoms into contact with each other on the surface of a metal or a metal oxide can be performed by employing a method of bringing hydrogen atoms into contact with the surface of a metal or a metal oxide, or a method of bringing a noble gas into contact with the surface of a metal or a metal oxide in the same manner as in the first and second aspects described above.

In the third aspect, when an ion beam of a noble gas is irradiated to the surface of a metal or a metal oxide together with a hydrogen-containing gas, the flux of noble gas ions may be selected as appropriate according to the type of the noble gas or the balance with the hydrogen partial pressure, and is preferably, for example, about $2\times10^{13}$ ions/cm$^2$·s.

The method for producing a noble gas hydride of the disclosure may further include other steps other than those described above.

Examples of the other steps include a surface cleaning step.

In the disclosure, it is preferable to have a surface cleaning step to clean a metal or a metal oxide from the viewpoint of preventing impurities from inhibiting the adsorption and occlusion of hydrogen atoms and a noble gas.

Surface Cleaning Step

In the surface cleaning step, at least a part of the surface of a metal or a metal oxide, which is the reaction surface where noble gas atoms react with hydrogen atoms to produce a hydride, is cleaned.

Examples of the method of cleaning the surface of a metal or a metal oxide include ion sputtering, heat treatment (for example, annealing and flashing), oxygen treatment, and a method combining two or more thereof.

Ion sputtering is a method in which a surface is cleaned by irradiating a metal or a metal oxide with noble gas ions by an ion sputtering method. The noble gas for producing noble gas ions is selected from the noble gases described above. Among them, argon is preferable.

The angle at which noble gas ions enter the surface of the metal or the metal oxide (angle of incidence) is preferably from 30° to 80°, and more preferably from 40° to 70° from the viewpoint of etching rate.

The acceleration energy of the ion beam irradiated when noble gas ions are irradiated is preferably from 500 V to 2000 V, and more preferably from 1000 V to 1500 V from the viewpoint of the depth of penetration of noble gas atoms.

The acceleration energy of the ion beam can be adjusted as appropriate by adjusting the voltage used to irradiate the ion beam in the ion sputtering method.

The temperature of the metal or the metal oxide at the time of noble gas ion irradiation is preferably from 600 K to 1000 K, and more preferably from 700 K and 900 K, from the viewpoint of promoting diffusion and rearrangement of atoms on the surface and near the surface.

The temperature of the metal or the metal oxide is a value obtained by measuring the temperature of the surface using a non-contact thermometer, thermocouple, or the like.

Heat treatment (annealing) is a method of planarizing a metal or a metal oxide by heating it to a high temperature. Annealing can be performed by heating a metal or a metal oxide directly or indirectly using a heater such as current-carrying heating, electron impact heating with a filament, oven, infrared heater, or sintering furnace.

The heating temperature during annealing may be from 500 K to 2000 K, and more preferably from 800 K to 1000 K.

Heat treatment (flashing) is a method of cleaning a metal or a metal oxide surface by heating it to a high temperature to desorb impurities.

Flashing can be performed by heating a metal or a metal oxide directly or indirectly at high temperature using a heater such as current-carrying heating, electron impact heating with a filament, oven, infrared heater, or sintering furnace.

The temperature of the metal or the metal oxide during flashing is preferably from 700 K to 2000 K, and more preferably from 1000 K to 1500 K.

The production of the noble gas hydride of the disclosure can be confirmed by detecting the product molecules (products) that are desorbed from the surface of the metal or the metal oxide when the temperature of the metal or the metal oxide is raised at a constant rate by the temperature programmed desorption (TPD) method using a quadrupole mass spectrometer (QMS), and identifying the QMS signal at a specific mass-to-charge ratio (m/e) by the peak waveform of the TPD spectrum obtained by plotting it against the temperature of the metal or the metal oxide.

<Fuel>

The fuel of the disclosure includes the noble gas hydride of the disclosure described above.

The fuel of the disclosure may include other components as necessary in addition to the noble gas hydride.

The noble gas hydride of the disclosure can be subjected to a combustion reaction as it is, and hydrogen can be extracted for hydrogen utilization.

The noble gas hydride of the disclosure is suitable as a fuel in the following points.
(1) Since the number of hydrogen atoms per molecule is large, more energy can be expressed.
(2) Of the noble gases, for example, argon is abundant in nature and inexpensive, making it useful as an alternative fuel to fossil fuels.
(3) Noble gas hydride is useful as a clean fuel suitable for the global environment because the only components produced when it is burned in the presence of oxygen are water and noble gases.
(4) The noble gas hydride of the disclosure is produced even at room temperature (25° C.) or higher, and thus has good thermal stability and excellent safety as a fuel.
(5) Since the noble gas hydride has a larger molecular size than a hydrogen molecule, it is less likely to leak from a storage container during storage, and thus has excellent safety.

The content ratio of the noble gas hydride in a fuel is not particularly limited, and may be from 10% by mass to 100% by mass with respect to the total mass of the fuel.

EXAMPLES

Hereinafter, the invention will be described more specifically with reference to examples, but the invention is not limited to the following examples unless it goes beyond the gist of the invention.

(Example 1): Example Based on First Aspect 1.1. Preparation
(1) Ultra-High Vacuum Apparatus
Custom-made two-tank ultra-high vacuum apparatus, manufactured by Vacuum Generators (UK; see Christoph Rakete, Ph.D. dissertation in the Department of Physics, Free University of Berlin, 2003).
(2) Analytical Apparatus
A. Analysis of Reaction Products:
Quadrupole mass spectrometer (QMS, manufactured by HIDEN Analytical (UK), HAL/3F RC 301 PIC System)
B. Structure and Composition Analysis of Substrate Surface:

Low energy electron diffraction (LEED)/Auger electron-spectroscopy (AES) apparatus (manufactured by SPECS GmbH (Germany). ErLEED 150)

(3) Ion Beam Irradiation of Noble Gas

Ion Source (manufactured by SPECS GmbH (Germany), IQE 11/35)

(4) Gas Introduction Method

The reactant gas was introduced by adjusting the partial pressure with a variable leak valve.

1.2. Substrate

Pd (111) single crystal substrate (MaTeck, 10 mmqp diameter, 2 mm thickness)

The Pd (111) single crystal substrate is a substrate of Pd single crystal, meaning that the target plane is the (111) plane of the single crystal.

The substrate was mounted in a sample holder at the tip of a cryostat and cooled to about 100 K by liquid nitrogen.

In addition, a filament was installed on the back of the substrate, and it was confirmed that the substrate could be heated up to 1250 K by electron impact heating with the filament. At this time, the surface temperature of the substrate was measured with an E-type (Chromel-Constantan, NiCr—CuNi) thermocouple (0.08 mm diameter).

1.3. Sample Gas

The purity of the sample gas used for the synthesis of noble gas hydrides is as follows.

Helium: 99.995%
Neon: 99.999%
Argon: 99.9999%
Krypton: 99.999%
Hydrogen ($H_2$): 99.995%
Deuterium ($D_2$): 99.995%

2.1. Experimental Operation

The synthesis of a noble gas hydride was performed in an ultimate vacuum apparatus with an achievable vacuum of $1\times10^{-1}$ Torr or less. The procedure for the synthesis of the noble gas hydride is as follows.

(1) Surface Cleaning of Pd(111) Single Crystal Substrate

The surface of a Pd(111) single crystal substrate was irradiated with argon (Ar) ions by the ion sputtering method at a substrate temperature of 800 K, heated (flashed) for a short time at 1200 K, and further annealed at 1000 K for several minutes to clean the substrate surface.

The electron impact method was used to heat the substrate.

The conditions are as follows.

<Ion Sputtering Conditions>
Noble gas: argon
Ion beam acceleration energy: 500 V or 100 V
Angle of incidence: 45°
Substrate surface temperature: 800 K (Kelvin)

<Annealing Conditions>
Heating temperature: 1000 K

<Flashing Conditions>
Heating temperature: 1200 K (2) Irradiation of Substrate Surface with Noble Gas Ions Subsequently, surface of the cleaned Pd(111) single crystal substrate was then irradiated with the desired noble gas ions by the ion sputtering method under the following conditions.

<Irradiation Conditions>
Ion beam irradiation of noble gas
Acceleration energy of ion beam: 1000 V
Angle of incidence: 0°
Ion irradiation amount: from $3\times10^{14}$ to $2\times10^{17}$ ions/cm$^2$
Substrate surface temperature: 100 K Type of noble gas: helium (He), neon (Ne), argon (Ar), and krypton (Kr)

The surface structure of the (111) plane of the Pd(111) single crystal substrate irradiated with noble gas ions was analyzed by the LEED/AES system (SPECS, ErLEED 150) described above.

As a result, it was confirmed that Ar$^+$ ions entered from the (111) surface of the substrate in the internal direction and agglomerated, forming Ar nanobubble structures and elongating the lattice spacing due to the uplift of the (111) surface. In addition, the presence of Ar atoms in the (111) plane and inside the substrate in the region irradiated by the Ar ion beam was confirmed by the temperature programmed desorption (TPD) method, respectively.

The amount of Ar atoms occluded was about $1\times10^{15}$ atoms per cm$^2$ in terms of ion irradiation amount.

(3) Adsorption and Occlusion of Hydrogen Atoms

Next, hydrogen gas ($H_2$ or $D_2$) was introduced through a variable leak valve to the surface of the Pd(111) single crystal substrate irradiated with noble gas ions under the following conditions, thereby reacting the noble gas atoms on the substrate with hydrogen atoms to attempt adsorption and occlusion of the hydrogen atoms.

<Hydrogen Adsorption/Occlusion Conditions>
Hydrogen exposure amount: 5000 L (1 L (Langmuir)= $10^{-6}$ Torr·s)
Substrate surface temperature: 115 K (4) Detection of Reaction Products By the temperature programmed desorption (TPD) method, the product molecules (products) desorbed from the surface of the substrate when the substrate was heated at a constant rate were detected using a quadrupole mass spectrometer (QMS). A TPD spectrum was obtained by plotting the QMS signal against the substrate temperature.

The presence of neon isotopes ($^{20}$Ne and $^{22}$Ne) was confirmed by QMS.

For the above detection, the signal intensity was measured under a constant partial pressure of noble gas to calibrate the quadrupole mass spectrometer (QMS) as necessary.

2.2. Experimental Data

FIG. 1 to FIG. 23 show TPD spectral data for helium hydride, neon hydride, and argon hydride, and krypton hydride, respectively.

FIG. 1 to FIG. 23 show the hydrides in order of mass-to-charge ratio (m/e; m: mass of $Ng_nH_m$, e: charge of $Ng_nH_m$) and are classified by light hydrogen ($H_2$), deuterium ($D_2$), and ion irradiation amount.

From the results shown in FIG. 1 to FIG. 7, it was confirmed that helium hydride (HeH$_m$) was produced corresponding to the mass-to-charge ratio whose peak was confirmed by the measurement by the temperature programmed desorption method.

From the results shown in FIG. 8 to FIG. 14, it was confirmed that neon hydride (NeH$_m$) corresponding to the mass-to-charge ratio whose peak had been confirmed by the measurement by the temperature programmed desorption method was produced.

From the results shown in FIG. 15 to FIG. 22, it was confirmed that argon hydride (ArH$_m$) corresponding to the mass-to-charge ratio whose peak had been confirmed by the measurement by the temperature programmed desorption method was produced.

Figure 23:
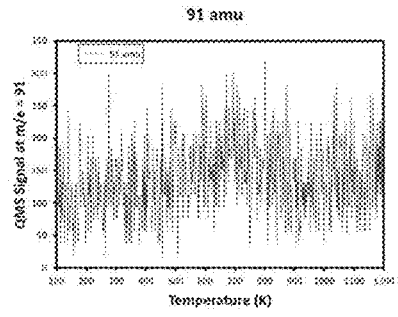
FIG. 23 shows a list of the compositions of krypton hydrides produced by the production method according to the first aspect, and their production conditions and TPD spectral data.
Figure 23:
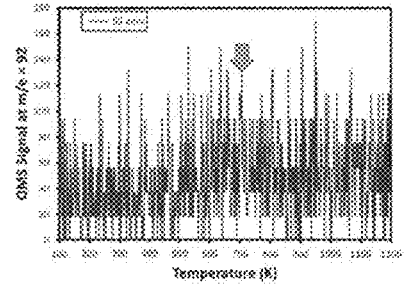
Figure 23:
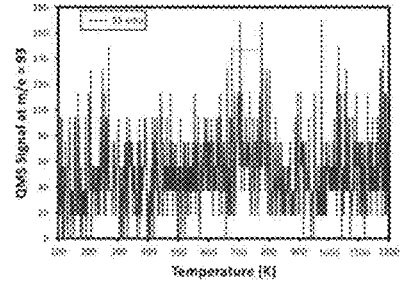

From the results shown in FIG. 23, it was confirmed that krypton hydride (KrH$_m$) corresponding to the mass-to-charge ratio whose peak had been confirmed by the measurement by the temperature programmed desorption method was produced.

The hydrides $Ng_nH_m$ (Ng: noble gas atom (He, Ne, Ar, and Kr), H: hydrogen atom, n: number of noble gas atoms, and m: number of hydrogen atoms) produced in the above manner were all mixtures of molecules with different numbers of hydrogen atoms.

The neon hydrides contained hydrides of isotopes of neon ($^{20}$Ne and $^{22}$Ne). The hydride ratio was found to approximate the naturally occurring ratio of $^2$Ne to $^{22}$Ne.

(Example 2): Example Based on Second Aspect

The same operations as in Example 1 were performed except that the order of (2) irradiation of noble gas ions to the substrate surface and (3) adsorption and occlusion of hydrogen atoms were reversed (hydrogen exposure amount: 5000 L (substrate surface temperature: 115 K), Ar ion irradiation amount: $3\times10^{14}$ ions/cm$^2$ (substrate surface temperature: 100 K)) in Example 1, and the reaction products were detected.

Figure 24:
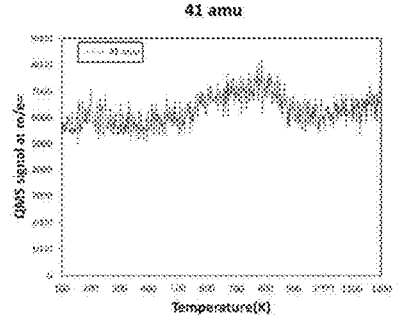
FIG. 24 shows a list of the compositions of argon hydrides produced by the production method according to the second aspect, and their production conditions and TPD spectral data.
Figure 24:
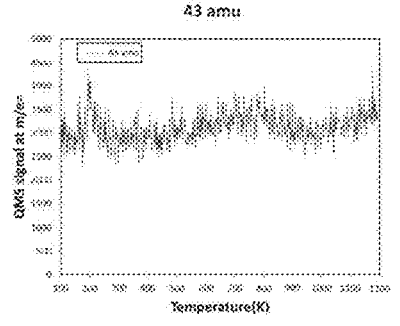
Figure 24:
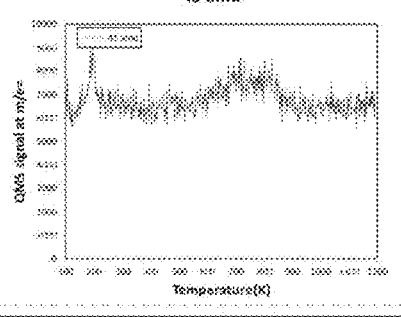
Figure 24:
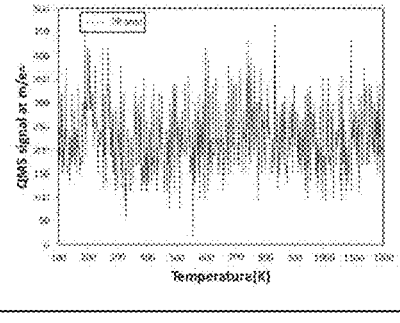

FIG. 24 shows the TPD spectral data of argon hydride.

From the results shown in FIG. 24, it was confirmed that argon hydride ($ArH_m$) corresponding to the mass-to-charge ratio whose peak had been confirmed by the measurement by the temperature programmed desorption method was produced.

(Example 3): Example Based on Third Aspect

The same operation as in Example 1 was performed except that (2) irradiation of noble gas ions to the substrate surface and (3) adsorption and occlusion of hydrogen atoms were replaced with the following operation a in Example 1, and the reaction products were detected.

Figure 25:
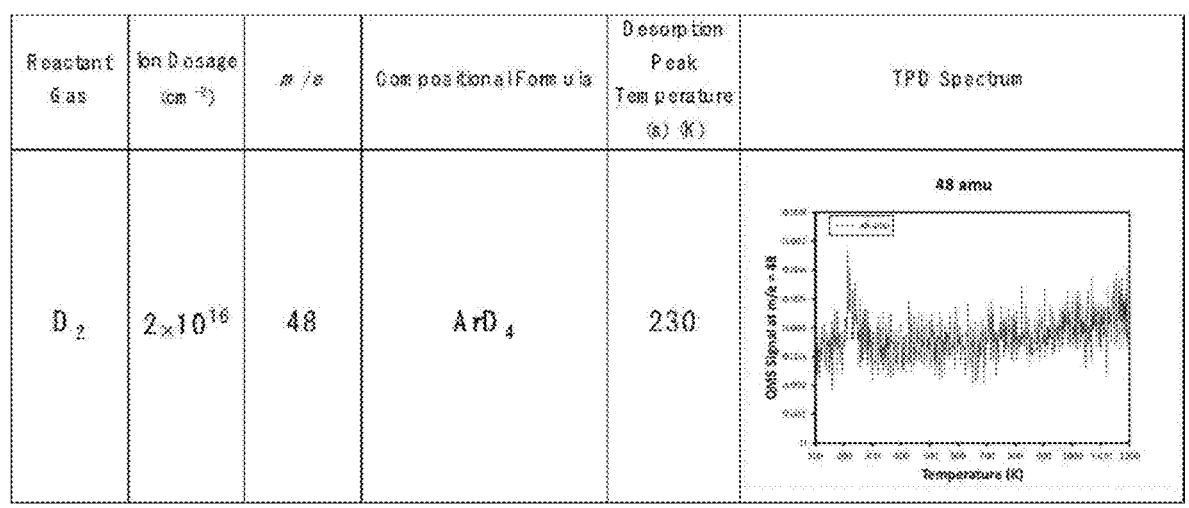
FIG. 25 shows a list of the composition of argon hydride produced by the production method according to the third aspect, and its production conditions and TPD spectral data.
Figure 26:
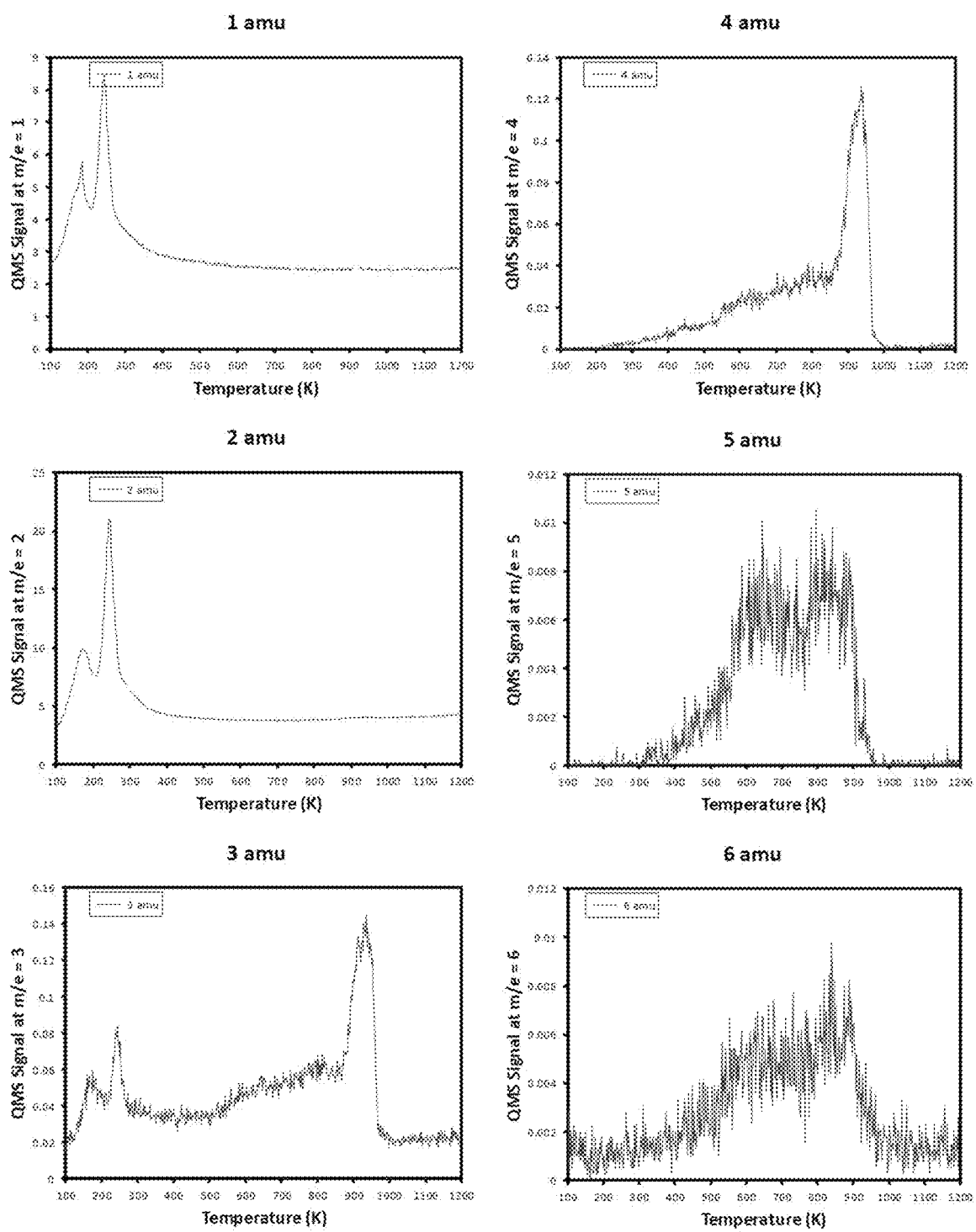
FIG. 26 shows the TPD spectral data of the products in the argon hydrogenation reaction in a case in which a Ni(111) single crystal substrate is used by the production method according to the first aspect.
Figure 27:
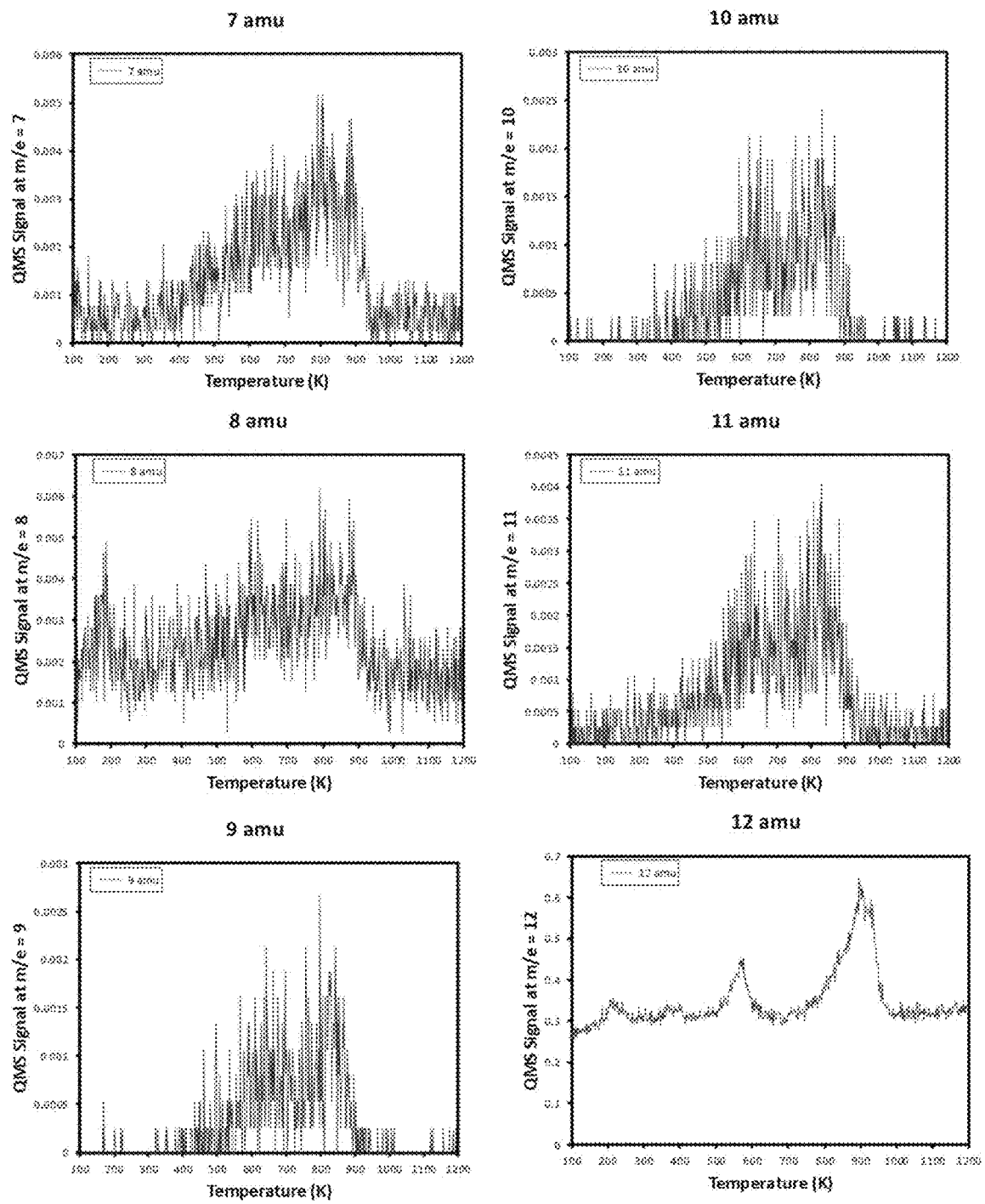
FIG. 27 shows the TPD spectral data of the products in the argon hydrogenation reaction in a case in which a Ni(111) single crystal substrate is used by the production method according to the first aspect.
Figure 28:
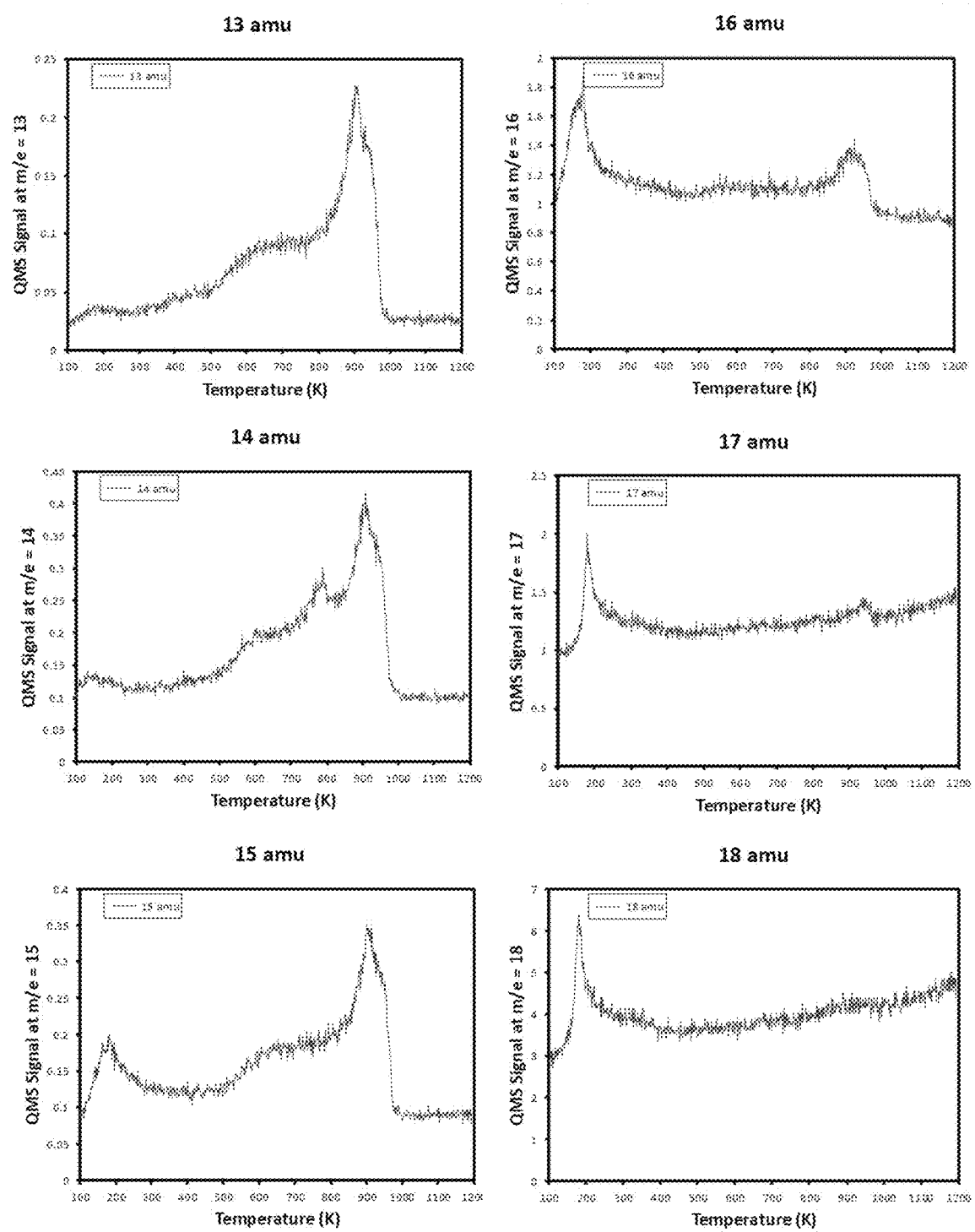
FIG. 28 shows the TPD spectral data of the products in the argon hydrogenation reaction in a case in which a Ni(111) single crystal substrate is used by the production method according to the first aspect.
Figure 29:
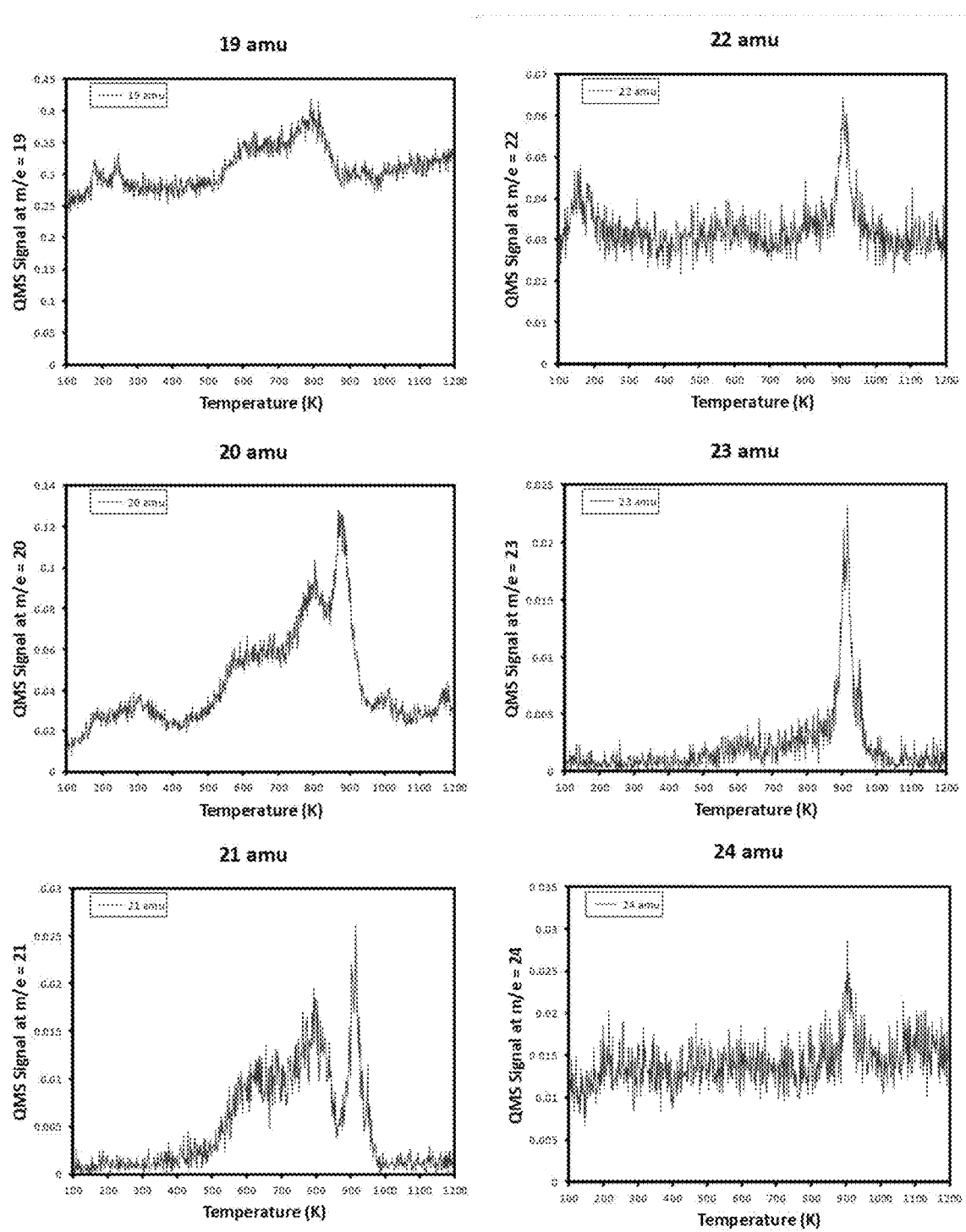
FIG. 29 shows the TPD spectral data of the products in the argon hydrogenation reaction in a case in which a Ni(111) single crystal substrate is used by the production method according to the first aspect.
Figure 30:
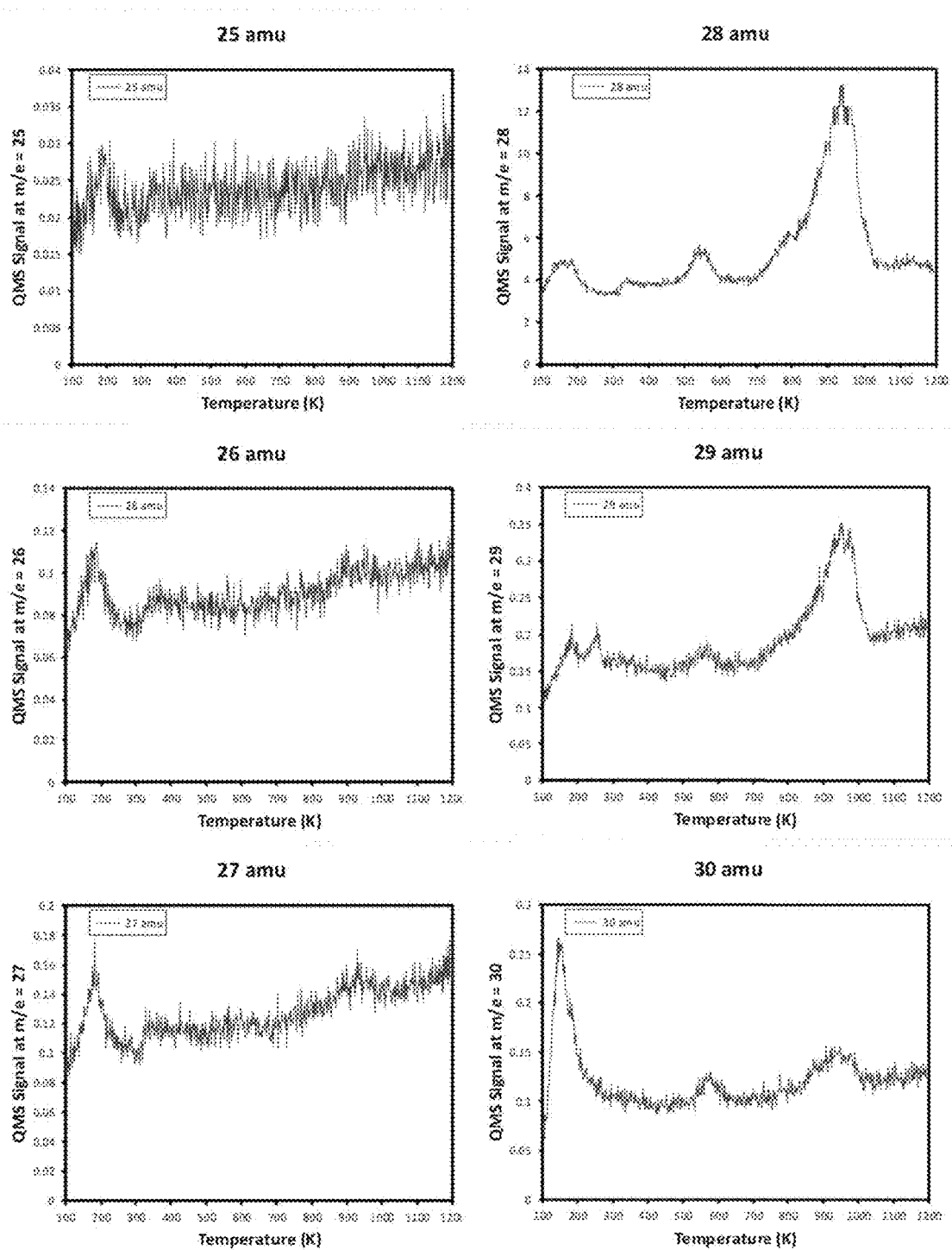
FIG. 30 shows the TPD spectral data of the products in the argon hydrogenation reaction in a case in which a Ni(111) single crystal substrate is used by the production method according to the first aspect.
Figure 31:
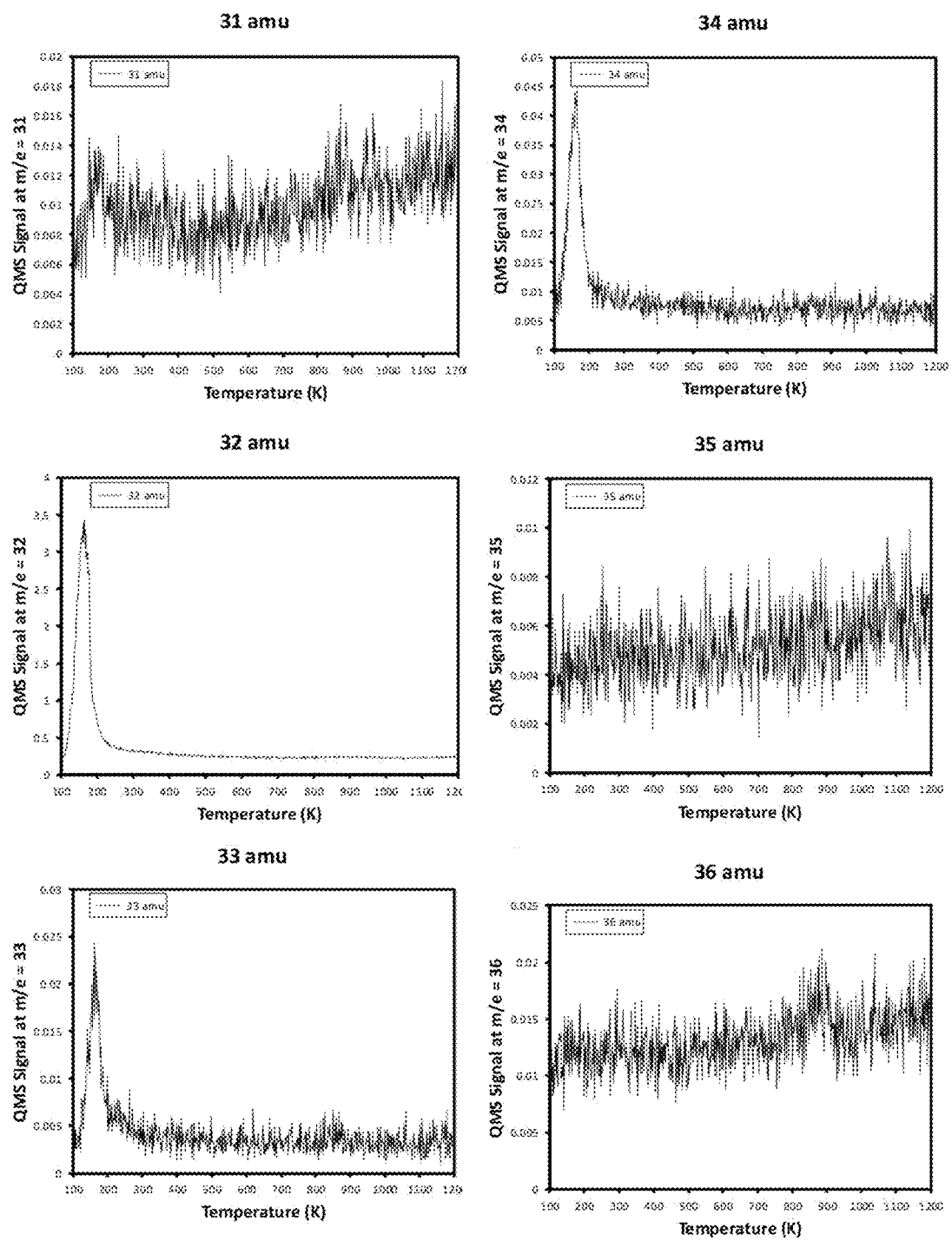
FIG. 31 shows the TPD spectral data of the products in the argon hydrogenation reaction in a case in which a Ni(111) single crystal substrate is used by the production method according to the first aspect.
Figure 32:
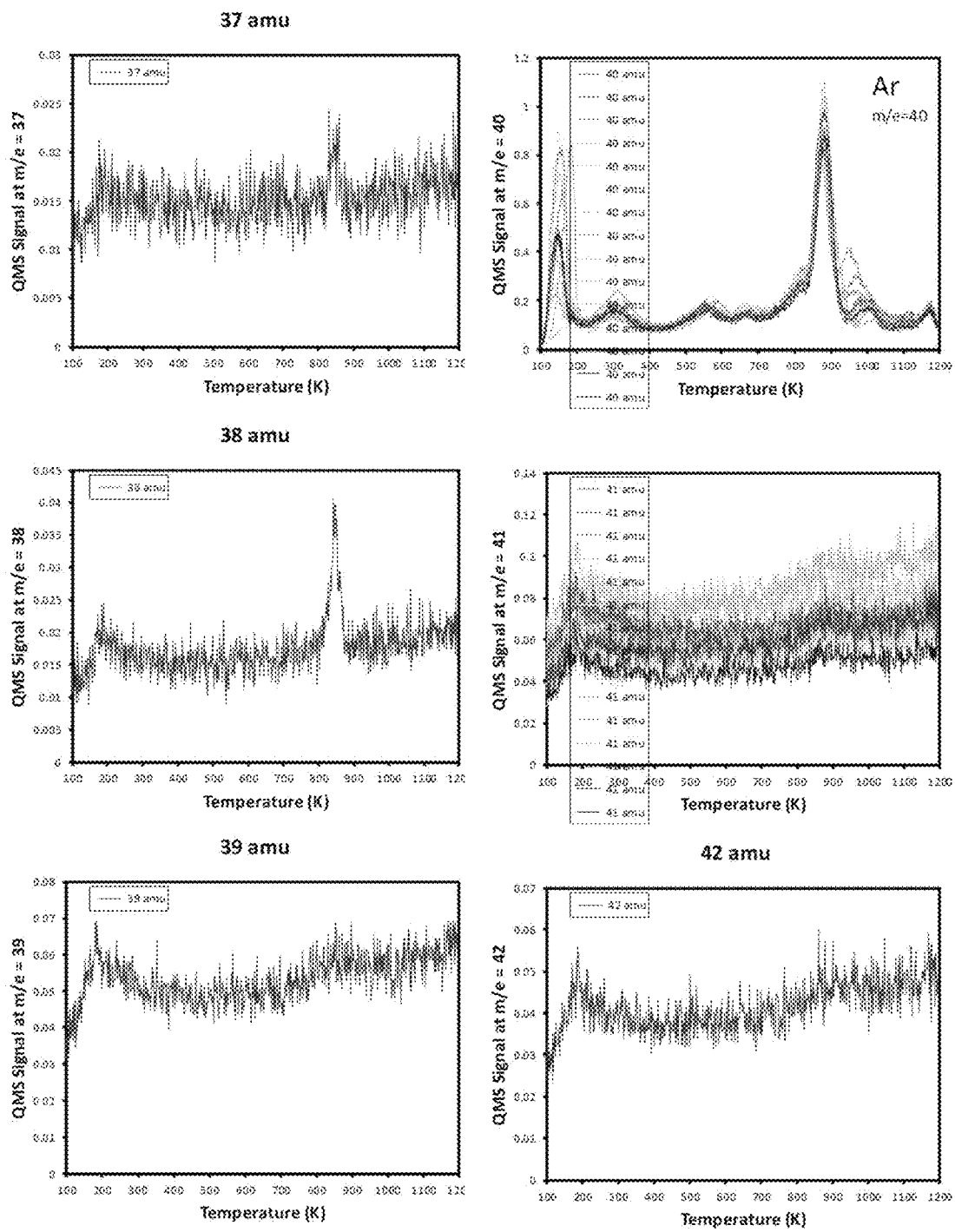
FIG. 32 shows the TPD spectral data of the products in the argon hydrogenation reaction in a case in which a Ni(111) single crystal substrate is used by the production method according to the first aspect.
Figure 33:
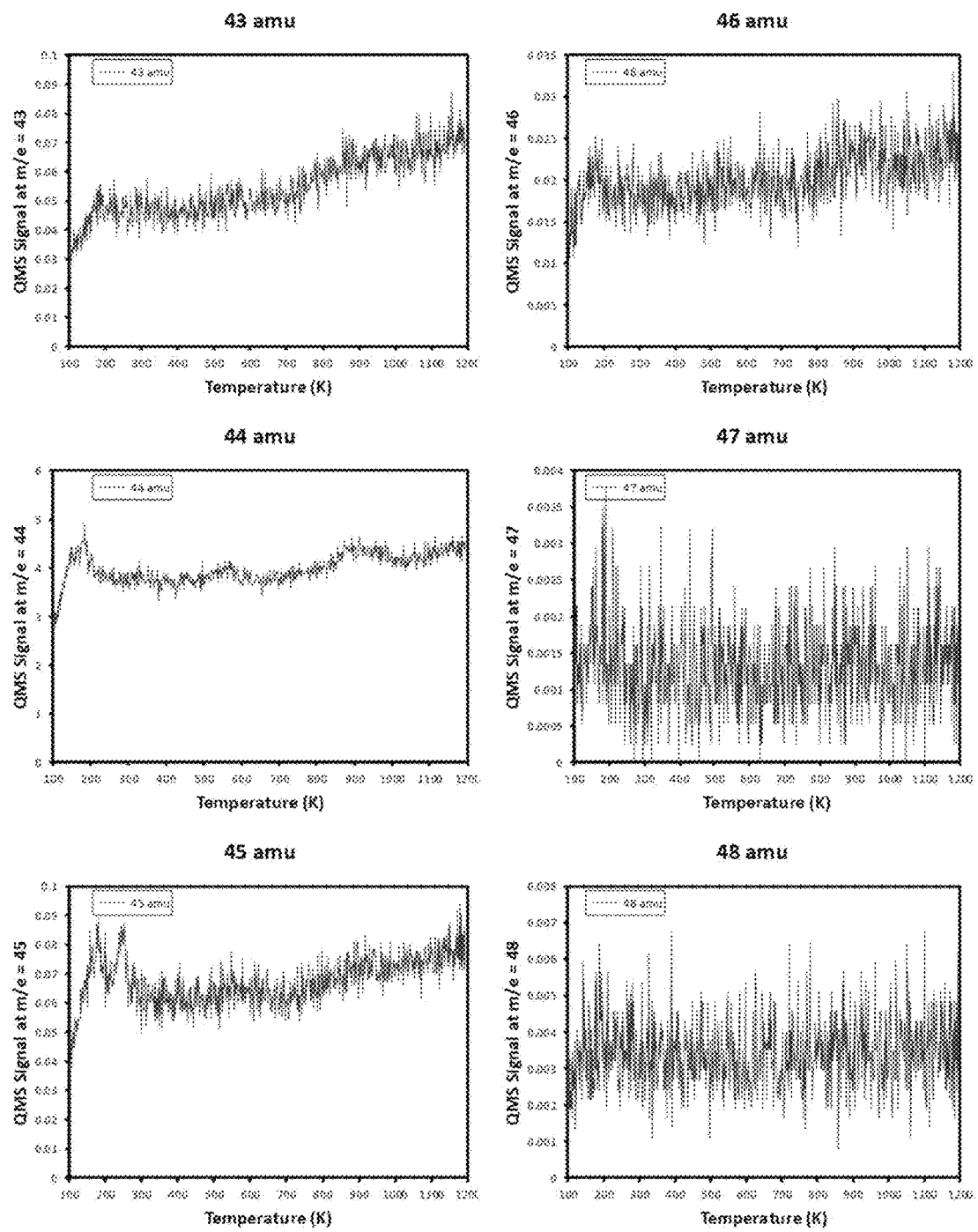
FIG. 33 shows the TPD spectral data of the products in the argon hydrogenation reaction in a case in which a Ni(111) single crystal substrate is used by the production method according to the first aspect.
Figure 34:
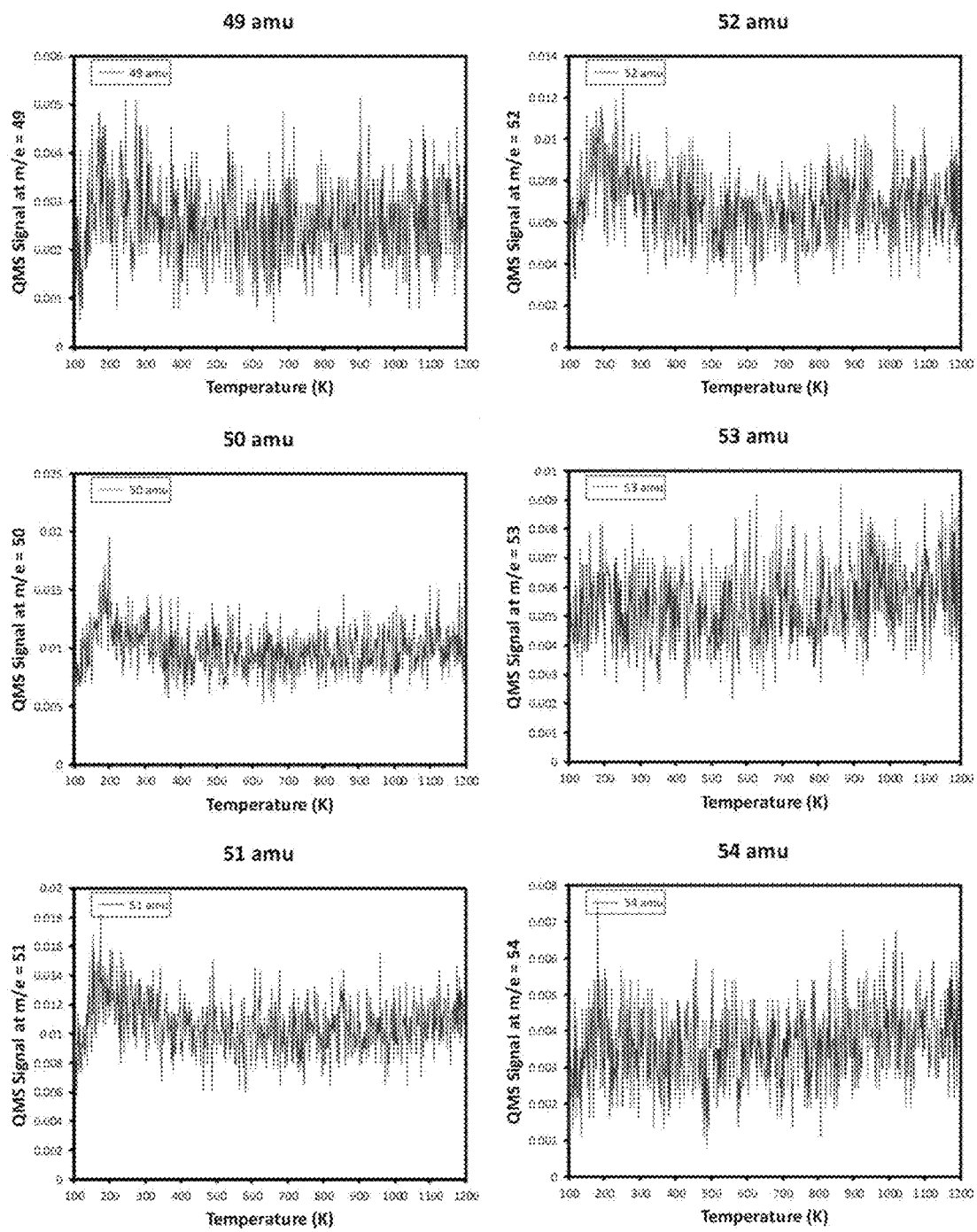
FIG. 34 shows the TPD spectral data of the products in the argon hydrogenation reaction in a case in which a Ni(111) single crystal substrate is used by the production method according to the first aspect.
Figure 35:
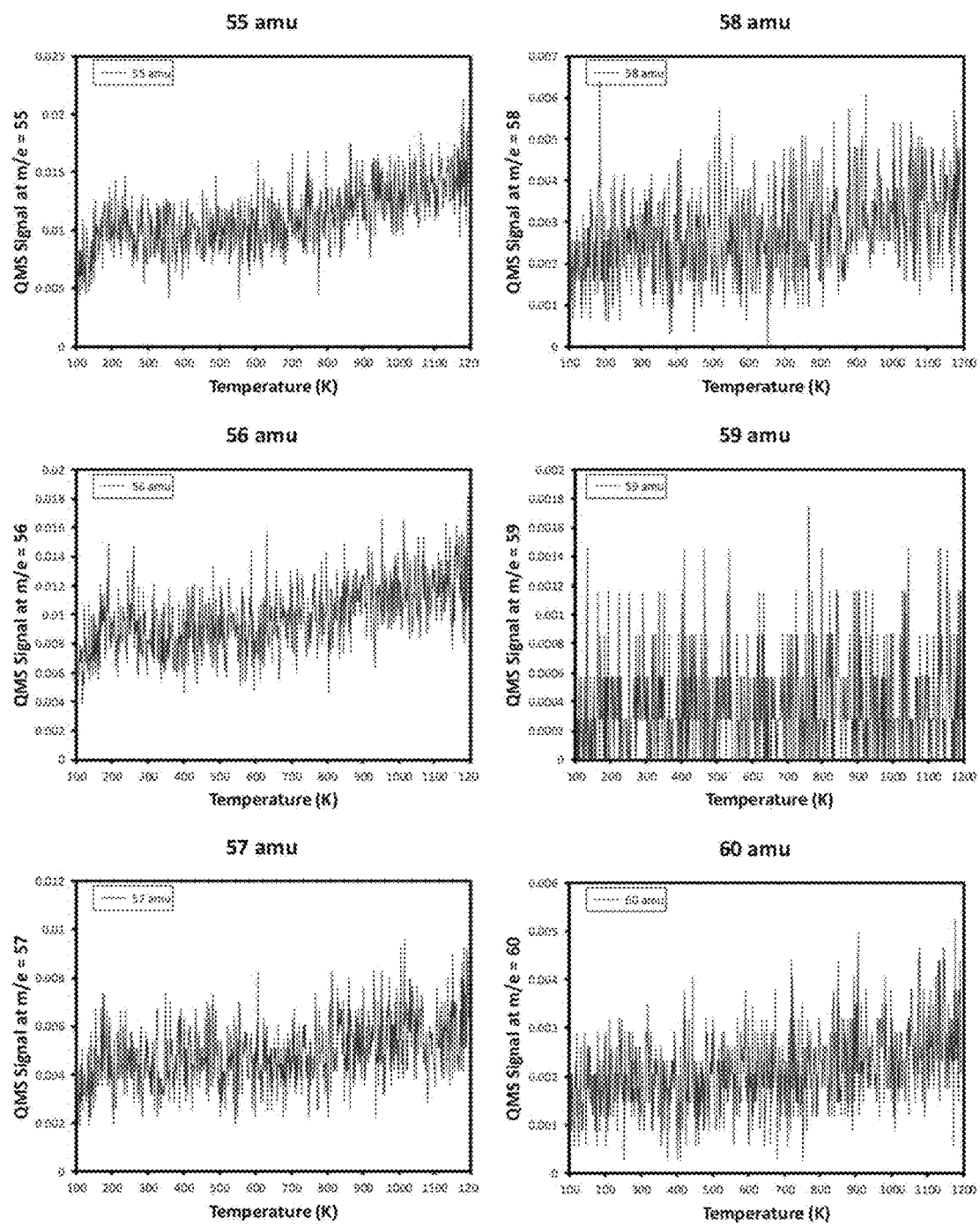
FIG. 35 shows the TPD spectral data of the products in the argon hydrogenation reaction in a case in which a Ni(111) single crystal substrate is used by the production method according to the first aspect.
Figure 36:
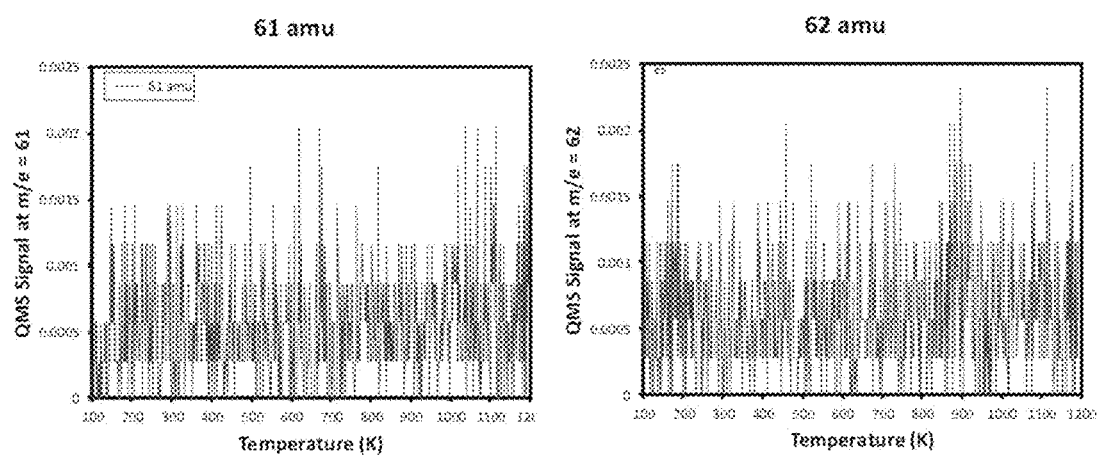
FIG. 36 shows the TPD spectral data of the products in the argon hydrogenation reaction in a case in which a Ni(111) single crystal substrate is used by the production method according to the first aspect.

FIG. 25 shows the TPD spectral data of argon hydride.

From the results shown in FIG. 25, it was confirmed that $ArD_4$ (m/e=48) corresponding to the mass-to-charge ratio whose peak was confirmed by the measurement by the temperature programmed desorption method was produced.

<Operation a>

The surface of the cleaned Pd(111) single crystal substrate was irradiated with the desired noble gas ions by the ion sputtering method under the following "irradiation conditions", and at the same time, deuterium gas ($D_2$) was irradiated under the following "hydrogen adsorption/occlusion conditions" by introducing the gas through a variable leak valve, thereby reacting the noble gas atoms with hydrogen atoms on the substrate surface.

<Irradiation Conditions>
  Ion beam irradiation of noble gas
  Acceleration energy of ion beam: 1000 V
  Angle of incidence: 0°
  Ion irradiation amount: $2\times10^{16}$ ions/cm$^2$
  Substrate surface temperature: 115 K
  Type of noble gas: Argon (Ar)

<Hydrogen Adsorption/Occlusion Conditions>
  Hydrogen exposure amount: 5000 L (1 L (Langmuir)= $10^{-6}$ Torr·s)
  Substrate surface temperature: 115 K (Example 4): Example Based on First Aspect In the same manner as in Example 1, the apparatus and other equipment were prepared, the substrate and sample gas were prepared, and the synthesis of argon (Ar) hydride was performed in an ultrahigh vacuum apparatus with an ultimate vacuum of $1\times10^{-10}$ Torr or less, except that the Pd(111) single crystal substrate was replaced with a Ni(111) single crystal substrate in Example 1.

1.1. Experimental Operation

The procedure for synthesizing the hydride of argon (Ar) is as follows.

(1) Surface Cleaning of Ni(111) Single Crystal Substrate

The surface of a Ni(111) single crystal substrate was irradiated with argon (Ar) ions by the ion sputtering method at a substrate temperature of 300 K, annealed at 1000 K for a few minutes, and further heated (flashed) at 1200 K for a short time to clean the substrate surface.

The electron impact method was used to heat the substrate.

The ion sputtering, annealing, and flashing conditions were the same as in Example 1.

(2) Irradiation of Substrate Surface with Argon (Ar) Ions

Subsequently, the surface of the cleaned Ni(111) single crystal substrate was irradiated with Ar ions (Ar*) by the ion sputtering method under the following Ar irradiation conditions.

<Ar Irradiation Conditions>
  Ar ion beam irradiation
  Acceleration energy of ion beam: 1000 V
  Angle of incidence: 0°
  Ion irradiation amount: $2\times10^{16}$ ions/cm$^2$
  Substrate surface temperature: 300 K The presence of Ar atoms in the substrate in the (111) plane of the Ni(111) single crystal substrate irradiated with Ar ions was confirmed by the temperature programmed desorption (TPD) method.

The amount of Ar atoms occluded was about $1\times10^{15}$ atoms per cm$^2$ in terms of ion irradiation amount.

(3) Adsorption and Occlusion of Hydrogen Atoms

Next, the surface of the Ar-irradiated Ni(111) single crystal substrate was irradiated with an ion beam of hydrogen molecular ions ($H_2^+$) under the following $H_2^+$ irradiation conditions 1 to cause the substrate to occlude hydrogen atoms and to react the hydrogen atoms with noble gas atoms that had already been occluded.

<$H_2^+$ Irradiation Conditions 1>
  Ion beam irradiation of hydrogen molecular ions ($H_2^+$)
  Acceleration energy of ion beam: 200 V
  Angle of incidence: 0°
  Ion irradiation amount: $2\times10^{11}$ ions/cm$^2$
  Substrate surface temperature: 90 K (4) Detection of Reaction Products By the temperature programmed desorption (TPD) method, the product molecules (products) desorbed from the surface of the substrate when the substrate was heated at a constant rate were detected using a quadrupole mass spectrometer (QMS). A TPD spectrum was obtained by plotting the QMS signal against the substrate temperature. For the above detection, the signal intensity was measured under a constant partial pressure of noble gas to calibrate the quadrupole mass spectrometer (QMS) as necessary.

1.2. Experimental Data

FIG. 26 to FIG. 36 show the TPD spectral data of the products in the argon hydrogenation reaction. FIG. 26 through FIG. 36 are listed in order of mass-to-charge ratio (m/e (atomic mass unit:amu); m: mass of $Ng_nH_m$, e: charge of $Ng_nH_m$).

From the results shown in FIG. 26 to FIG. 36, it was confirmed that argon hydride ($ArH_m$) corresponding to the mass-to-charge ratio whose peak was confirmed by the measurement by the temperature programmed desorption method was produced.

Figure 37:
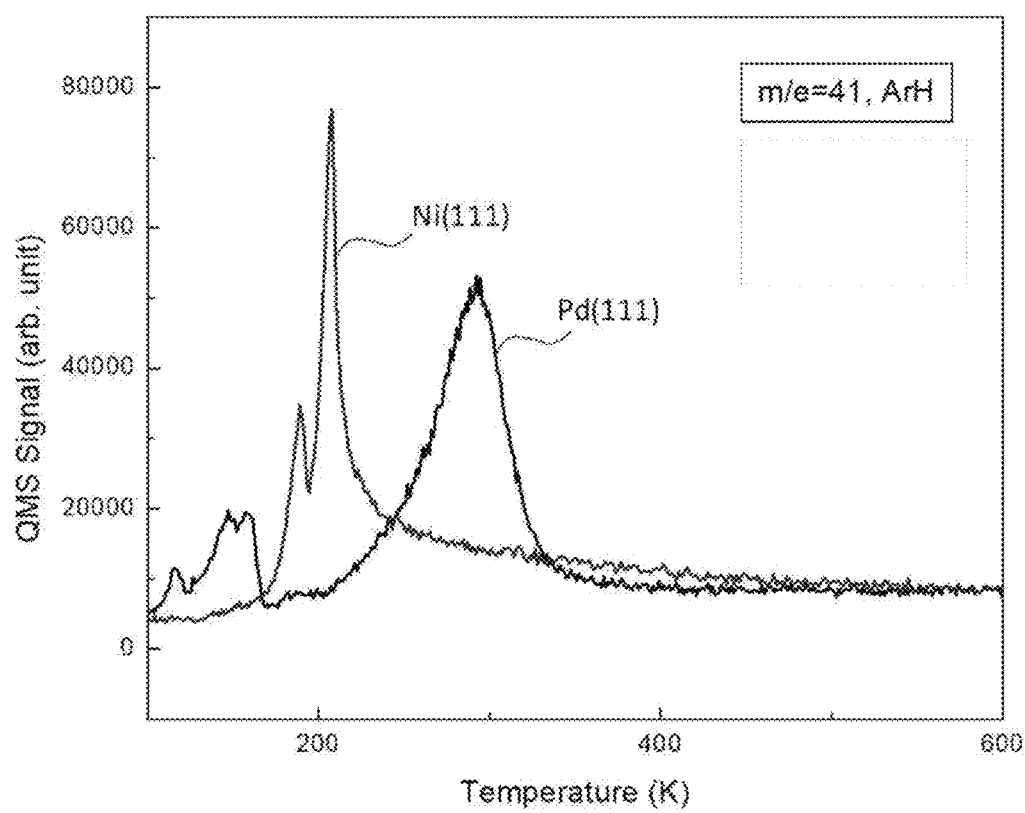
FIG. 37 is a graph showing the TPD spectral data of argon hydride in a case in which a Ni(111) single crystal substrate is used in comparison with a case in which a Pd(111) single crystal substrate is used.

FIG. 37 shows a comparison of the ArH TPD spectra in a case in which a Pd(111) single crystal substrate is used and in a case in which a Ni(111) single crystal substrate is used.

The results in FIG. 37 show that the formation of argon hydride is also observed when Ni(111) single crystal substrate is used, indicating that the temperature at which ArH is detected is different when Pd(111) single crystal substrate is used and w % ben Ni(111) single crystal substrate is used.

It was confirmed that the yield of noble gas hydride ($Ng_nH_m$) using a Ni(111) single crystal substrate was equal to or higher than that using a Pd(111) single crystal substrate described above.

The hydrides $Ng_nH_m$ (Ng: noble gas atom (Ar), H: hydrogen atom, n: number of noble gas atoms, and m: number of hydrogen atoms) produced in the above manner were all mixtures of molecules with different numbers of hydrogen atoms.

Figure 38:
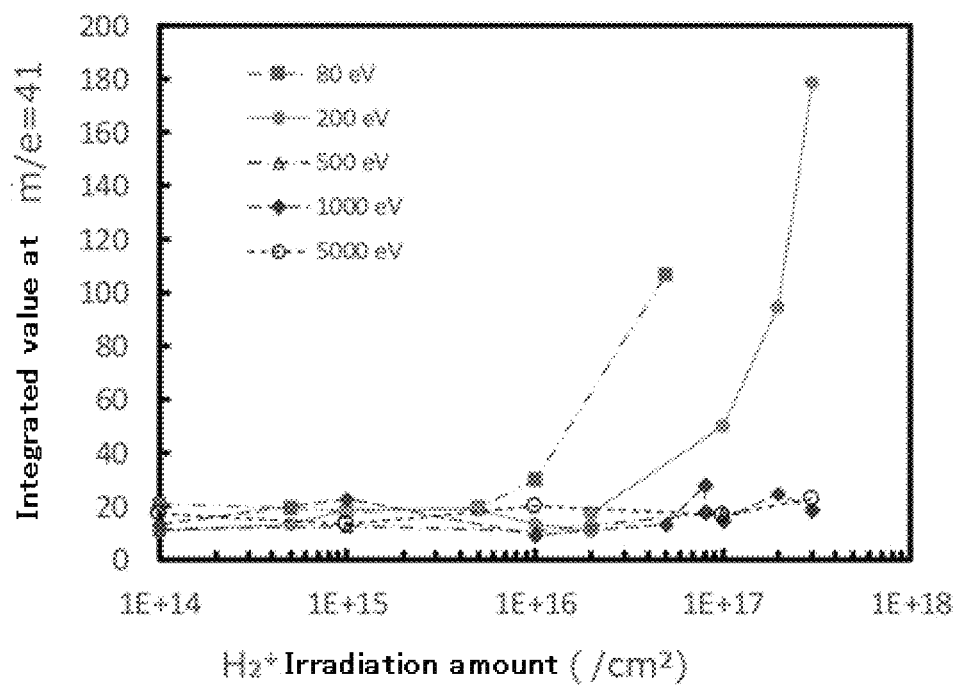
FIG. 38 is a graph showing the dependence of the $H_2^+$ irradiation amount on the production amount of argon hydride in a case in which a Ni(111) single crystal substrate is used.

Furthermore, in the above, the production amounts of argon hydride ArH at the mass-to-charge ratio (m/e) under the same ion beam irradiation conditions of $H_2^+$ except that the acceleration energy was changed from 200 V to 80 V, 500 V, 1000 V, or 5000 V were compared. The results are shown in FIG. 38. As shown in FIG. 38, up to an irradiation amount of about $1 \times 10^{16}$ ions/cm$^2$ of $H_2^+$, there is not much difference depending on the acceleration energy. However, it can be seen that when the irradiation amount is larger, the increase in the production amount of argon hydride is more remarkable in a case in which the acceleration energy of $H_2^+$ is 80 V and 200 V. It is presumed that the acceleration energy of $H_2^+$ is too large, the hydrogen atoms will enter too deep from the surface of the substrate, and the reactivity with the occluded argon will be adversely reduced. Therefore, the acceleration energy of $H_2^+$ is preferably from 50 V to 300 V, and more preferably from 70 V to 250 V.

(Example 5): Example Based on First Aspect

In the same manner as in Example 4, the synthesis of xenon (Xe) hydride was performed in an ultrahigh vacuum apparatus with an ultimate vacuum of $1 \times 10^{-10}$ Torr or less, except that the Ar irradiation conditions in "(2) Argon (Ar) ion irradiation to the substrate surface" were changed to the following Xe irradiation conditions, and the surface of the cleaned Ni(111) single crystal substrate was irradiated with xenon (Xe) ions by the ion sputtering method, and the "$H_{2+}$ irradiation conditions 1" in "(3) Adsorption and occlusion of hydrogen atoms" were changed to the following "$H_2^+$ irradiation conditions 2" in Example 4.

Figure 39:
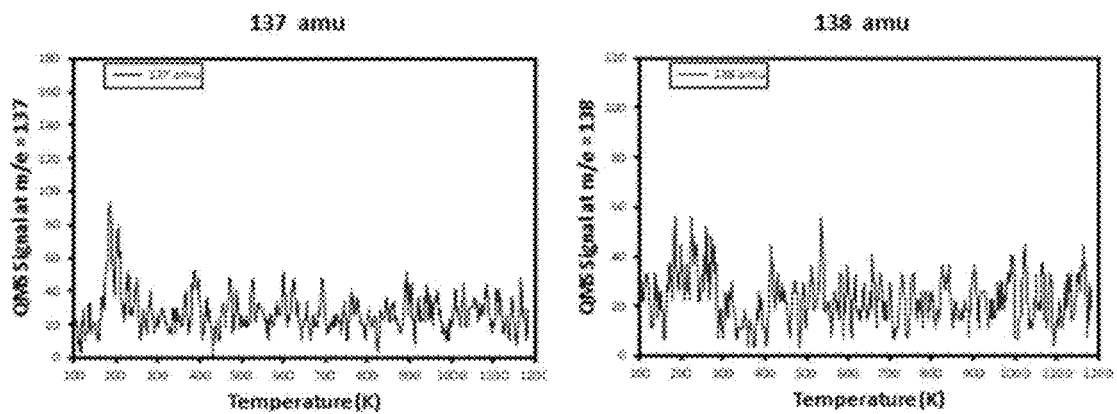
FIG. 39 shows graphs of the moving average data of TPD spectra of xenon hydride produced using a Ni(111) single crystal substrate by the production method according to the first aspect.

<Xe Irradiation Conditions>
Ion beam irradiation of Xe (purity: 99.999%-)
Acceleration energy of ion beam: 1000 V
Angle of incidence: 0°
Ion irradiation amount: $2 \times 10^{16}$ ions/cm$^2$
Substrate surface temperature: 200 K
<$H_2^+$ irradiation conditions 2>
Ion beam irradiation of hydrogen ion ($H_2^+$)
Acceleration energy of ion beam: 200 V
Angle of incidence: 0°
Ion irradiation amount: $2 \times 10^{16}$ ions/cm$^2$
Substrate surface temperature: 90 K Experimental Data FIG. 39 shows the moving average data of the TPD spectrum of xenon hydride. FIG. 39 shows two species with different mass-to-charge ratios (m/e (atomic mass unit: amu)); m: mass of $Ng_nH_m$, e: charge of $Ng_nH_m$).

From the results shown in FIG. 39, it was confirmed that $^{136}$XeH and $^{136}$XeH$_2$, which are hydrogenated xenon ($XeH_m$) corresponding to the mass-to-charge ratios whose peaks were confirmed by the temperature programmed desorption method, were produced.

The hydrides $Ng_nH_m$ (Ng: noble gas atom (Xe), H: hydrogen atom, n: number of noble gas atoms, and m: number of hydrogen atoms) produced in the above manner were all mixtures of molecules with different numbers of hydrogen atoms.

INDUSTRIAL APPLICABILITY

The noble gas hydride of the disclosure is suitable for hydrogen storage applications, and can be used for, for example, fuels.

Specific applications of the noble gas hydride of the disclosure include chemical reagents (hydrogen additives), combustion improves (for example, mixing aids to city gas), superconductors, precursors of metallic hydrogen, and media for chemical lasers.

The method for producing a noble gas hydride of the disclosure can be used for, for example, resource recovery of hydrogen byproducts from caustic soda production or other process, tritium recovery, and selective separation and collection of specific noble gases.

The disclosure of Japanese Patent Application No. 2019-126288 filed on Jul. 5, 2019 is incorporated herein by reference in its entirety.

All documents, patent applications, and technical standards described in this specification are incorporated herein by reference to the same extent as if each document, patent application, and technical standard were specifically and individually indicated to be incorporated by reference.

The invention claimed is:

1. A noble gas hydride selected from the group consisting of:
   HeH$_m$ where m represents an integer of from 1 to 4,
   NeH$_m$ where m represents an integer of 1 or 2, and
   ArH$_m$ where m represents an integer of from 1 to 4.

2. A fuel or a noble gas hydride releasing material for releasing a noble gas hydride according to claim 1.

3. A method for producing a noble gas hydride according to claim 1, comprising:
   (a) bringing a surface of a metal or a metal oxide into contact with a noble gas to perform at least one of adsorption of noble gas atoms to the surface or occlusion of noble gas atoms into an interior of the metal or the metal oxide, and
   (b) bringing the noble gas atoms present at at least one of the surface or the interior into contact with hydrogen atoms under a temperature condition of from 50 K to 298 K;
   (c) bringing a metal or a metal oxide into contact with a hydrogen-containing gas under a temperature condition of from 50 K to 298 K to allow hydrogen atoms to be present at at least one of a surface or an interior of the metal or the metal oxide, and
   (d) bringing the hydrogen atoms present at the metal or the metal oxide into contact with a noble gas; or
   (e) supplying both a hydrogen-containing gas and a noble gas to a surface of a metal or a metal oxide; and
   (f) bringing hydrogen atoms and noble gas atoms into contact on the surface of the metal or the metal oxide under a temperature condition of from 50 K to 298 K.

4. The method for producing a noble gas hydride according to claim 3, wherein, in (b), the hydrogen atoms are produced by bringing the metal or the metal oxide into contact with a hydrogen-containing gas.

5. The method for producing a noble gas hydride according to claim 3, wherein the metal or a metal of the metal oxide comprises at least one of nickel, copper, or palladium.

6. The method for producing a noble gas hydride according to claim 3, wherein the noble gas atom is helium, neon, argon, krypton, or xenon.

7. The method for producing a noble gas hydride according to claim 3, comprising heating the metal or the metal oxide before or after contact between noble gas atoms or a noble gas and hydrogen atoms, or simultaneously with contact between noble gas atoms or a noble gas and hydrogen atoms.

8. The noble gas hydride releasing material according to claim 2, which releases a noble gas hydride by temperature elevation.

9. The noble gas hydride releasing material according to claim 8, wherein the material is a metal or a metal oxide, and the metal or a metal of the metal oxide comprises at least one of nickel, or palladium.

* * * * *